United States Patent
Davies et al.

(10) Patent No.: US 9,250,075 B2
(45) Date of Patent: Feb. 2, 2016

(54) GENERATING TRAVEL TIME DATA

(71) Applicants: Charles Linfield Davies, Woodgreen (GB); Peter Robert John Lilley, Hindhead (GB)

(72) Inventors: Charles Linfield Davies, Woodgreen (GB); Peter Robert John Lilley, Hindhead (GB)

( * ) Notice: Subject to any disclaimer, the term of this patent is extended or adjusted under 35 U.S.C. 154(b) by 428 days.

(21) Appl. No.: 13/723,928

(22) Filed: Dec. 21, 2012

(65) Prior Publication Data

US 2013/0166204 A1 Jun. 27, 2013

(30) Foreign Application Priority Data

Dec. 23, 2011 (GB) .................................. 11 22 383.1

(51) Int. Cl.
*G01C 21/20* (2006.01)
*G01C 21/00* (2006.01)
*G01C 21/34* (2006.01)

(52) U.S. Cl.
CPC ................ *G01C 21/00* (2013.01); *G01C 21/34* (2013.01)

(58) Field of Classification Search
None
See application file for complete search history.

(56) References Cited

U.S. PATENT DOCUMENTS

| | | | | |
|---|---|---|---|---|
| 5,911,773 A * | 6/1999 | Mutsuga | ............ | G01C 21/3492 340/990 |
| 6,304,821 B1 * | 10/2001 | Shimamoto | ........ | G01C 21/3492 340/990 |
| 6,421,606 B1 * | 7/2002 | Asai | ................... | G01C 21/3423 701/410 |
| 6,591,188 B1 * | 7/2003 | Ohler | ................. | G01C 21/3415 340/990 |
| 7,257,570 B2 * | 8/2007 | Riise | ................... | G06F 17/3087 707/706 |
| 7,409,643 B2 * | 8/2008 | Daughtrey | ........... | G06Q 10/025 705/5 |
| 8,306,749 B1 * | 11/2012 | Petersen | ............ | G01C 21/3641 340/988 |
| 8,688,290 B2 * | 4/2014 | Jotanotivc | .......... | G01C 21/3617 701/1 |
| 8,775,080 B2 * | 7/2014 | Mizuno | .............. | G01C 21/3617 701/521 |
| 8,892,350 B2 * | 11/2014 | Weir | ...................... | G09B 29/00 701/400 |
| 2002/0026289 A1 * | 2/2002 | Kuzunuki | .............. | G01C 21/34 702/150 |
| 2002/0156572 A1 * | 10/2002 | Bullock | ............. | G01C 21/3484 701/420 |
| 2003/0036848 A1 * | 2/2003 | Sheha | ................ | G01C 21/3679 701/468 |
| 2004/0024523 A1 * | 2/2004 | Uotani | ............... | G01C 21/3492 701/411 |

(Continued)

FOREIGN PATENT DOCUMENTS

EP 2 375 364 A1 10/2011

*Primary Examiner* — Jonathan M Dager
(74) *Attorney, Agent, or Firm* — Harness, Dickey & Pierce, P.L.C.

(57) ABSTRACT

The generation of travel time data is disclosed in which coordinates are received for a starting location (1901). A maximum travel time is received (1903) and processed graph data is read that includes nodes representing pre-filtered map features and edges representing travel times between nodes. A temporary graph is built (1907) of selected nodes that can be reached via selected edges within the maximum travel time. Candidate destinations are received (1908) and the travel time to these candidate destinations is tested (1909) with reference to the temporary graph.

11 Claims, 24 Drawing Sheets

(56) References Cited

U.S. PATENT DOCUMENTS

| | | | |
|---|---|---|---|
| 2004/0249568 A1* | 12/2004 | Endo | G01C 21/3492 701/410 |
| 2004/0267447 A1* | 12/2004 | Takizawa | G01C 21/3415 701/416 |
| 2005/0027448 A1* | 2/2005 | Takenaga | G01C 21/3694 701/431 |
| 2005/0093720 A1* | 5/2005 | Yamane | G01C 21/3492 340/995.13 |
| 2005/0102099 A1* | 5/2005 | Linn | G01C 21/36 701/411 |
| 2005/0137788 A1* | 6/2005 | Kimura | G06F 17/30241 701/426 |
| 2006/0129315 A1* | 6/2006 | Kanematsu | G01C 21/3461 340/995.1 |
| 2006/0241862 A1* | 10/2006 | Ichihara | G01C 21/343 701/533 |
| 2007/0129882 A1* | 6/2007 | Sano | G01C 21/3446 701/533 |
| 2008/0077314 A1* | 3/2008 | Ishikawa | G08G 1/096716 701/117 |
| 2008/0086455 A1* | 4/2008 | Meisels et al. | G01C 21/26 |
| 2009/0037101 A1* | 2/2009 | Koike | G01C 21/3664 701/533 |
| 2009/0164116 A1* | 6/2009 | Kawauchi | G01C 21/3415 701/533 |
| 2009/0234572 A1* | 9/2009 | Matsuo et al. | G01C 21/3679 701/533 |
| 2009/0271105 A1* | 10/2009 | Kindo | G01C 21/3407 701/439 |
| 2009/0281719 A1* | 11/2009 | Jakobson | G06Q 30/02 701/439 |
| 2009/0281720 A1* | 11/2009 | Jakobson | G08G 1/0969 701/426 |
| 2009/0319176 A1* | 12/2009 | Kudoh | G01C 21/3617 701/408 |
| 2010/0036606 A1* | 2/2010 | Jones | G01C 21/3446 701/533 |
| 2010/0106401 A1* | 4/2010 | Naito | B60L 11/1809 701/533 |
| 2010/0106539 A1 | 4/2010 | Kenefic | |
| 2010/0145569 A1* | 6/2010 | Bourque | G06Q 10/047 701/31.4 |
| 2010/0185479 A1* | 7/2010 | Brinton | G06G 1/096805 701/408 |
| 2010/0222995 A1* | 9/2010 | Tu | G01C 21/3446 701/532 |
| 2010/0228574 A1* | 9/2010 | Mundinger | G06Q 10/047 705/4 |
| 2010/0262362 A1* | 10/2010 | Naito | G01C 21/343 701/424 |
| 2010/0312464 A1* | 12/2010 | Fitzgerald | G01C 21/343 701/532 |
| 2011/0032110 A1* | 2/2011 | Taguchi | B60L 3/12 340/636.1 |
| 2011/0040479 A1* | 2/2011 | Uyama | G01C 21/3446 701/533 |
| 2011/0077854 A1* | 3/2011 | Fushiki | G01C 21/3469 701/533 |
| 2011/0099100 A1* | 4/2011 | Onishi | G01C 21/3469 705/37 |
| 2011/0184636 A1* | 7/2011 | Rolf | G01C 21/3679 701/532 |
| 2011/0224900 A1* | 9/2011 | Hiruta | G01C 21/3469 701/533 |
| 2011/0246061 A1* | 10/2011 | Hayashi | G01C 21/3469 701/533 |
| 2012/0059584 A1* | 3/2012 | Nesbitt | G01C 21/00 701/527 |
| 2012/0123678 A1* | 5/2012 | Poppen | G01C 21/3476 701/468 |
| 2012/0173135 A1* | 7/2012 | Gutman | G01C 21/3469 701/408 |
| 2012/0185793 A1* | 7/2012 | Binsztok | G06Q 10/02 715/772 |
| 2012/0197714 A1* | 8/2012 | Beyeler | G01C 21/3682 705/14.49 |
| 2012/0215432 A1* | 8/2012 | Uyeki | G08G 1/096827 701/118 |
| 2012/0271737 A1* | 10/2012 | Sato | G09B 29/007 705/26.62 |
| 2012/0316782 A1* | 12/2012 | Sartipi | G01C 21/367 701/455 |

* cited by examiner

| REGION | NODE |
|--------|------|
| 1501R | 901 |
| 1502R | 903 |
| 1505R | 906 |
| 1506R | 907 |
| 1601R | 911 |
| 1504R | 904 |
| 1507R | 915 |
| 1508R | 919 |
| 1405R | 912 |
| 1407R | 923 |
| 1509R | 937 |
| 1603R | 932 |
| 1604R | 931 |
| 1511R | 930 |
| 1512R | 928 |

*Fig. 18*

GENERATING TRAVEL TIME DATA

CROSS REFERENCE TO RELATED APPLICATIONS

This application claims priority from United Kingdom patent application 11 22 383.1, filed Dec. 23, 2011, the entire disclosure of which is incorporated herein by reference.

BACKGROUND OF THE INVENTION

1. Field of the Invention

The present invention relates to a method of generating output data identifying travel times from a starting location to candidate destinations. The present invention further relates to a data output generating apparatus for generating output data identifying travel times from input data consisting of a starting location and candidate destinations.

2. Description of the Related Art

In addition to representing journeys in terms of distances, it is also known to describe such journeys in terms of the time that would be taken, possibly using various forms of transport. It is also known to produce maps with isochrones, showing locations that have a similar travel time, irrespective of geographical distance. However, these do not facilitate the ranking of candidate destinations in terms of their travel times. Existing technical solutions also present problems in terms of calculating travel times using available processing capabilities in real time.

BRIEF SUMMARY OF THE INVENTION

According to an aspect of the present invention, there is provided a method of generating travel time data, comprising the steps of: receiving coordinates from a starting location; receiving a maximum travel time; reading processed graph data comprising nodes representing pre-filtered map features and edges representing travel times between said nodes; building a temporary graph of selected nodes that can be reached via selected edges within said maximum travel time; receiving candidate destinations; and testing the travel time to said candidate destinations with reference to said temporary graph.

BRIEF DESCRIPTION OF THE DRAWINGS

FIG. 18 shows a table associating nodes with regions;

DETAILED DESCRIPTION OF EXAMPLE EMBODIMENTS

FIG. 1

Recent technical advances have improved the way in which large quantities of data may be searched to produce information that may be co-ordinated over a network to provide results to a user. Increasingly, these results may be conveyed to mobile devices; whereby the overall system allows a user to make informed decisions in real-time.

Figure 1:
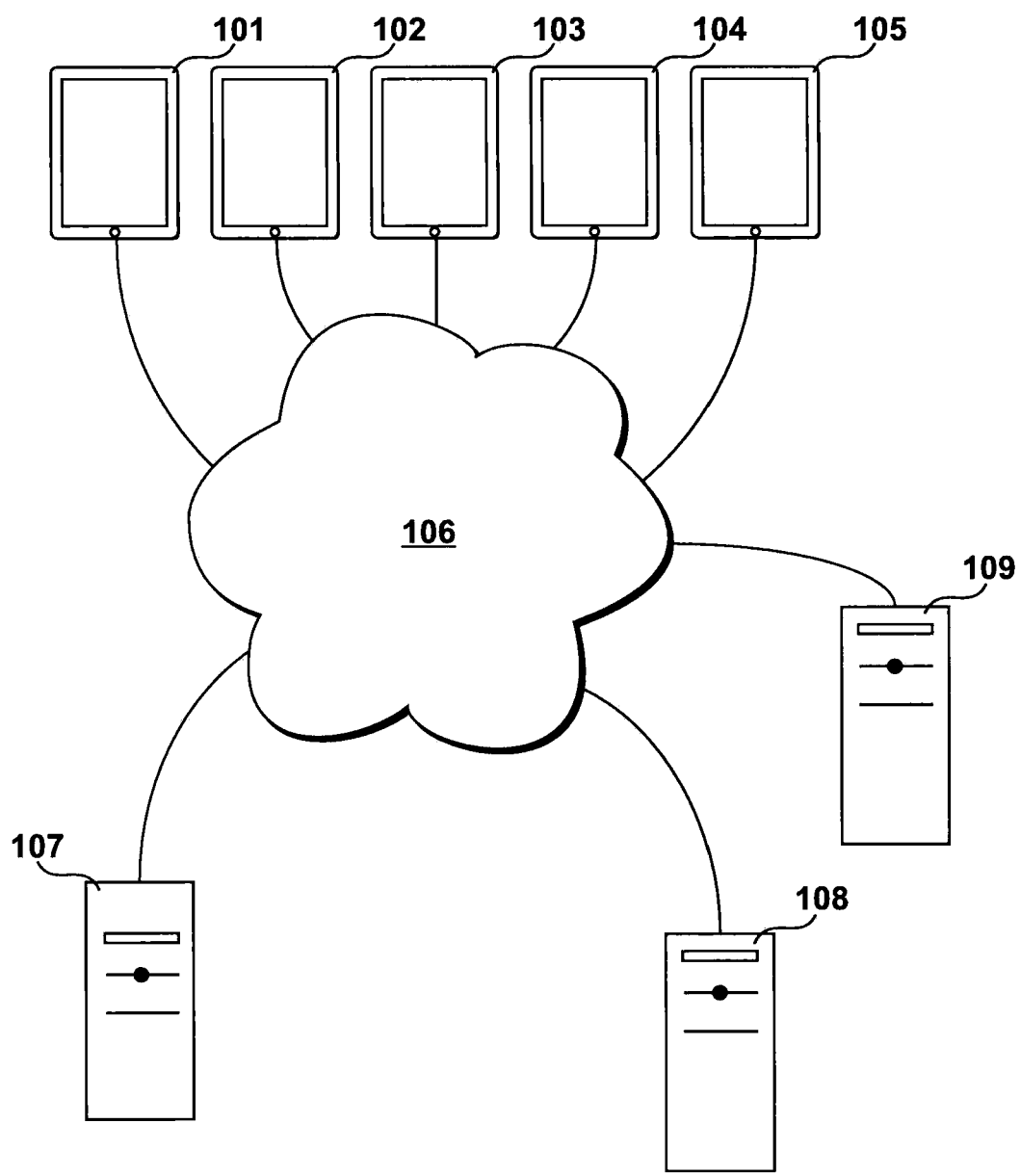
FIG. 1 shows an environment in which the present invention may be implemented, including mobile devices.

In the environment of FIG. 1, user mobile devices 101, 102, 103, 104 and 105 are shown communicating over a network 106 with a first service provider server 107 and a second service provider server 108. Server 107 provides, in this example, a first service showing first entity types ranked according to preferences defined by a user. Similarly, server 108 provides a second service showing second entity types also ranked according to preferences defined by a user. These preferences may include distances from a specified starting location. However, by deploying an embodiment of the present invention, it is possible for rankings defined in terms of distances to be replaced by rankings determined by travel times.

To achieve rankings defined in terms of travel times or journey times, data relating to a specific journey may be read from a service enhancing server 109. In this embodiment, end users 101 to 105 do not communicate with the service enhancing server 109 directly; the provision of journey time related data (as distinct from distance data) is provided to the primary service providers 107, 108 etc as a procedure for enhancing the service that they provide.

In an embodiment, the server computer 109 is configured to generate travel time data. It has a processor that is configured to receive coordinates starting location; receive a maximum travel time; read processed graph data comprising nodes representing pre-filtered map features and edges that include representations of travel times between said nodes. It is also configured to build a temporary graph of selected notes that can be reached via selected edges within the maximum travel time, receive candidate destinations and test the travel time to the candidate destinations with reference to the temporary graph.

In an embodiment, the processor of the server computer 109 is also configured to divide a geographical region repeatedly so that each divided region includes one exclusive graph node and thereby create a two-dimensional binary space partitioning tree. The starting location is translated to the location of graph node by making reference to the two-dimensional binary space partitioning tree. Each candidate location is then tested upon arrival with reference to the two-dimensional binary space partitioning tree.

In an embodiment, the server computer 109 also includes a cache such that the cache is configured to store a previously built temporary graph to facilitate repeated searches from the starting location but from different candidate destinations.

In an embodiment, program applications are downloaded to mobile devices 101 to 105 such that, when executing, the mobile device is configured to receive travel time data from the server computer 109.

In an embodiment, the mobile devices also include components for generating location data representing the location of the mobile device, wherein the location data is conveyed computer to identify starting location.

FIG. 2

Figure 2:
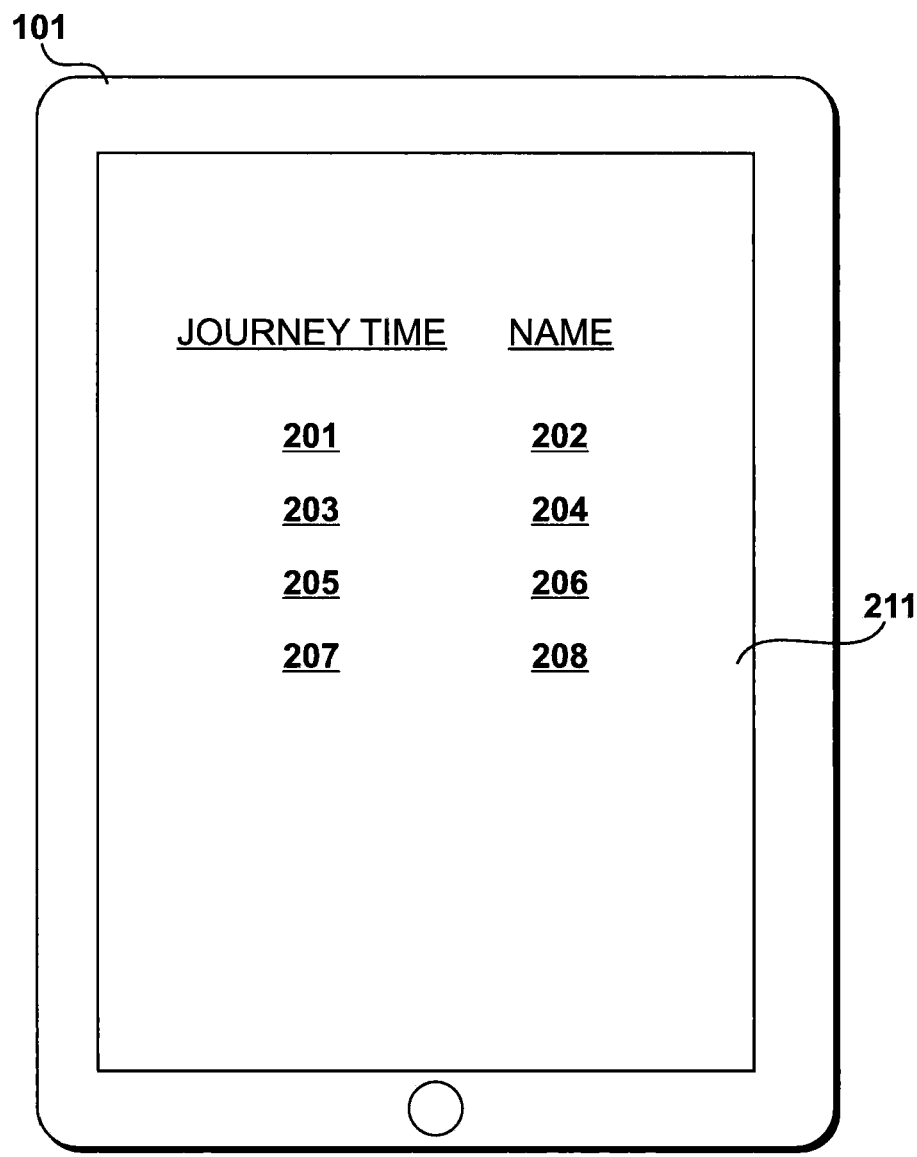
FIG. 2 details a mobile device identified in FIG. 1.

Mobile device 101 is detailed in FIG. 2, having received results of a recently defined search. A visual display 211 shows four destinations of interest, identified as 202, 204, 206 and 208. They have been ranked in terms of their journey time (and not distance) from the location of mobile device 101 and actual journey times are displayed which, in ascending order, are shown as 201, 203, 205 and 207.

Details of the starting location may be supplied automatically from the mobile device or entered by a user.

FIG. 3

Figure 3:
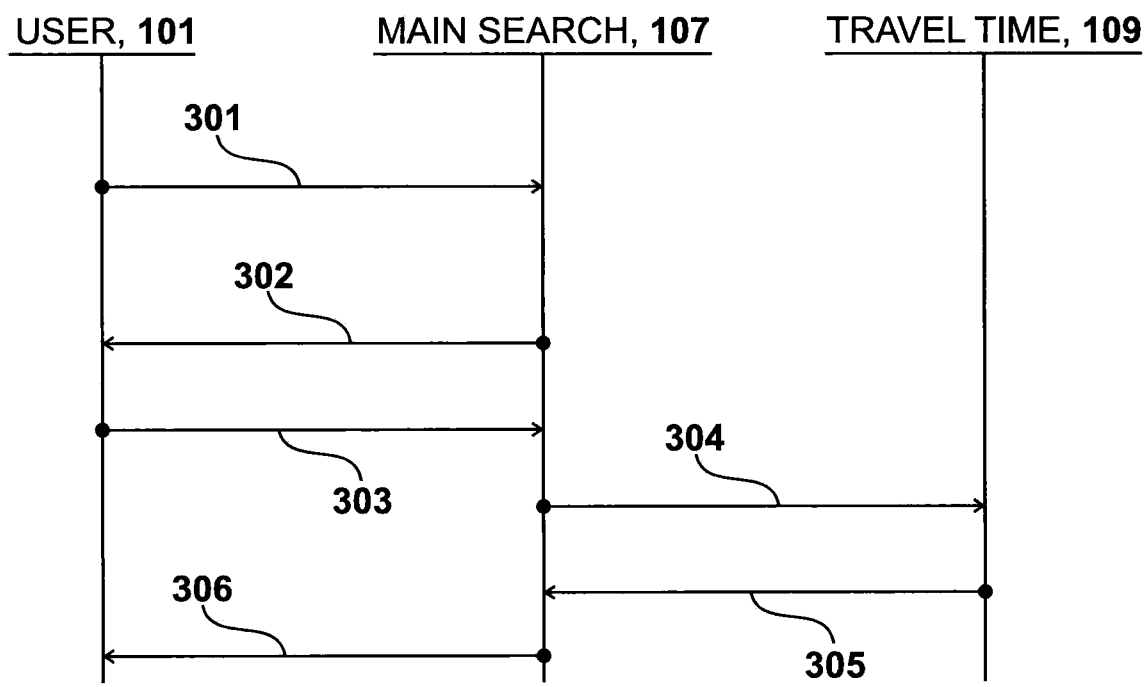
FIG. 3 show a protocol diagram illustrating operations performed within the environment of FIG. 1.

A protocol diagram illustrating operations performed within the environment of FIG. 1 is shown in FIG. 3. In this example, user device 101 makes a request at first communication 301 for a location-based search to be performed by the first service provider server 107. Server 107 returns data as a second communication 302 representing a graphical user interface inviting a user to specify preferences in relation to the service being requested. Thus the request may be to locate a vendor of a particular type that is the shortest journey time from the user's present location or a selected location.

Data is entered by the user which is returned as communication 303 to the service provider 107. The service provider 107 parses the request for the search to be prioritised in terms of journey time the mode of transport.

Candidate destinations are selected based on the available criteria. Each candidate is given an identification which is conveyed as fourth communication 304 to the service enhancing server 109, along with grid references (latitude and longitude) of each identified candidate, and the grid reference of the starting position.

The service enhancing server 109 now has details of a starting position and the location of one or more candidate destinations. In this embodiment the service enhancing server does not need to know the nature of the destination candidates.

Using procedures detailed herein, the service enhancing server 109 returns data as a fifth communication 305 back to the first service provider server 107 identifying each candidate, along with a calculated journey time.

The journey time data is processed by the first service provider 107 to provide meaningful search result data as a sixth communication 306 back to the user, that includes the journey time information. This data is provided quickly, and represents valid journey time values that are perceivably more useful than mere distances.

FIG. 4

Figure 4:
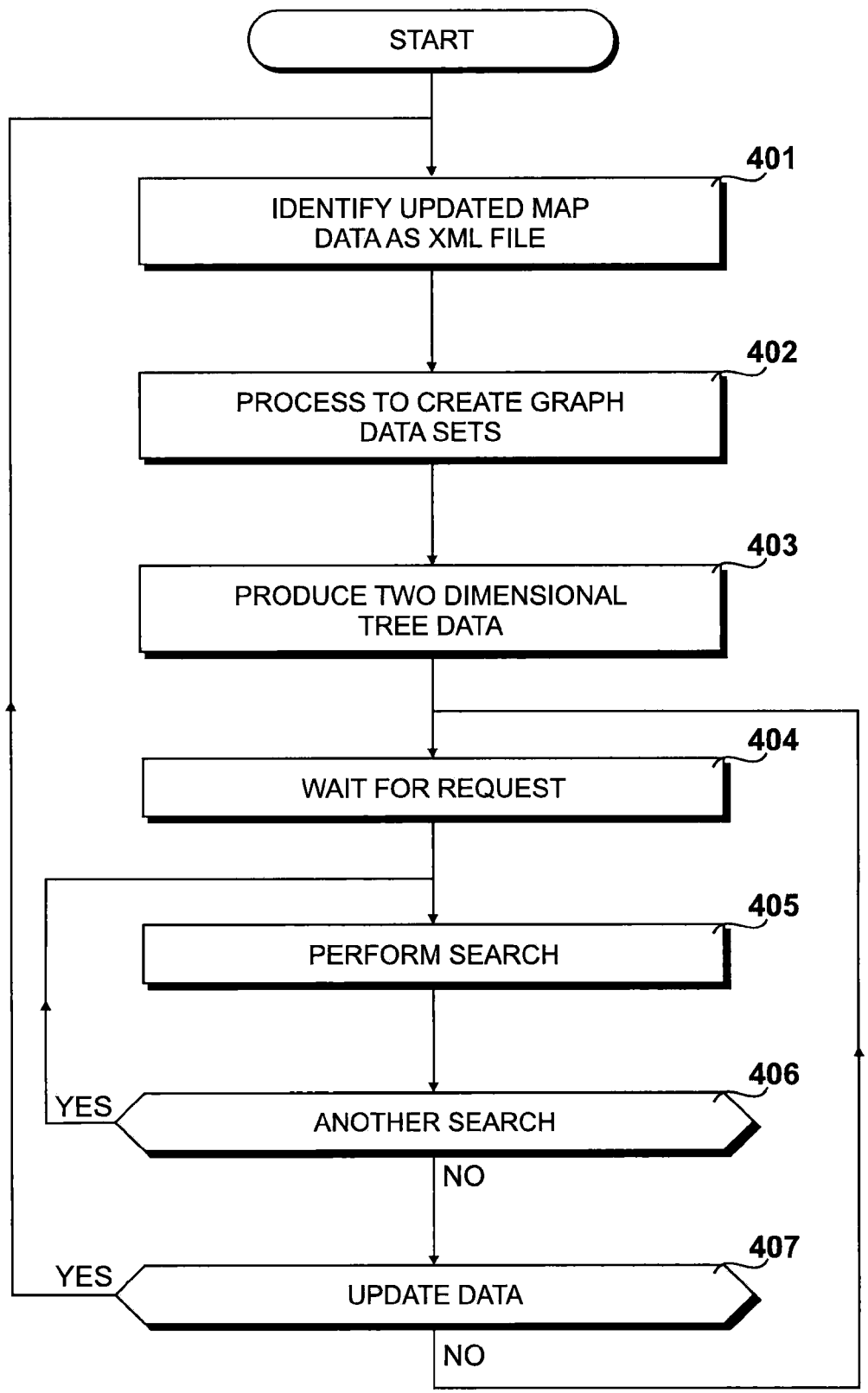
FIG. 4 shows operations performed by the enhanced server 109.

Operations performed by the service enhancing server 109 are shown in FIG. 4. The operations provide for the generation of output data identifying travel times to a plurality of candidate destinations from a previously specified starting position. Furthermore, having identified a maximum travel time, it is possible for further searching to be conducted with different criteria identifying different destination types but all lying within the originally defined maximum travel time.

When a search is being performed, coordinates are received identifying a starting location. A maximum travel time is also identified for an assumed mode of transport or alternatively a specific mode of transport may be defined. Processed graph data is read that comprises graph nodes representing pre-filtered map features and edges representing travel times between said graph nodes. A temporary graph is built of selected nodes that can be reached via selected edges within the maximum travel time. Having constructed the temporary graph, of temporary nodes and temporary edges, candidate destinations may be processed, by each of these being tested with reference to the temporary graph data.

Thus, before a search can be conducted, in an embodiment, a pre-processing step of generating the graph data is performed. As illustrated at step 401, updated map data may be identified as an XML file. This map data may define any geographical area. For many applications, the map data represents large urban areas, such as cities. The applicant has found that XML files of this type are available for most geographical areas. However, in addition to the information required for the present purpose, map data of this type also includes large amounts of additional data that is not required.

The XML file of map data will show roads, footpaths, overground railways and subway railways. When travelling, it is possible for a journey to be made using different modes of transport. In an embodiment, journey times may be provided with respect to walking, travelling by road and travelling by subway trains. In an alternative embodiment, travel times may also be calculated for cycling, bus travelling and overground train travelling. In an embodiment, nodes represent map features selected from options comprising road intersections, bus stops, bicycle parks, railway stations, underground stations and vehicle charging stations. Thus, in an embodiment, travel times could be provided for travelling between electric vehicle charging posts.

At step 402, the XML file of map data is processed to create graph data. The graph data defines graph nodes with edges connecting these nodes that record travel times between nodes.

Figure 10:
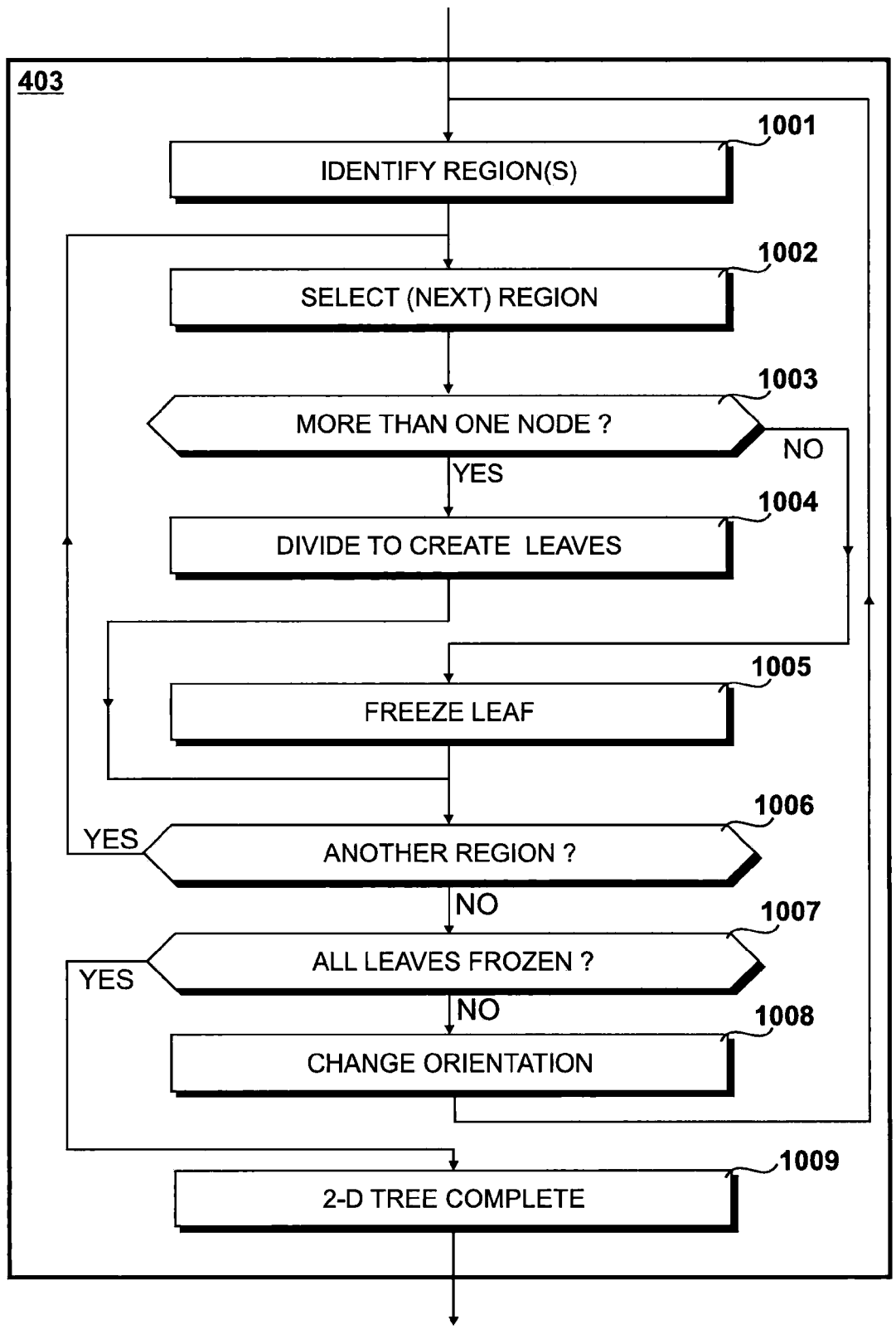
FIG. 10 details procedures for performing a search.

At step 403 two-dimensional tree data is produced by a process of binary space partitioning, as detailed in FIG. 10, to allow nodes to be selected from input data identifying coordinates. Thus, stages 401 to 403 represent pre-processing stages that create temporary data structures to facilitate rapid and accurate searching in real time.

Having created the temporary data, the system waits for a request at step 404. Upon receiving a request for a search, the search itself is performed at step 405. Thus, having received data identifying a starting location and a plurality of candidate destinations, data is returned identifying travel times from this starting location to each of these candidate destinations.

At step 406 a question is asked as to whether another search is required and if answered in the affirmative a further search is performed at step 405.

If another search is not required, a question is asked at step 407 as to whether the data is to be updated. If answered in the affirmative, updated map data is again identified at step 401 and appropriate temporary data is created. If the question asked at step 407 is answered in the negative, the system waits for the next search request at step 404.

FIG. 5

Figure 5:
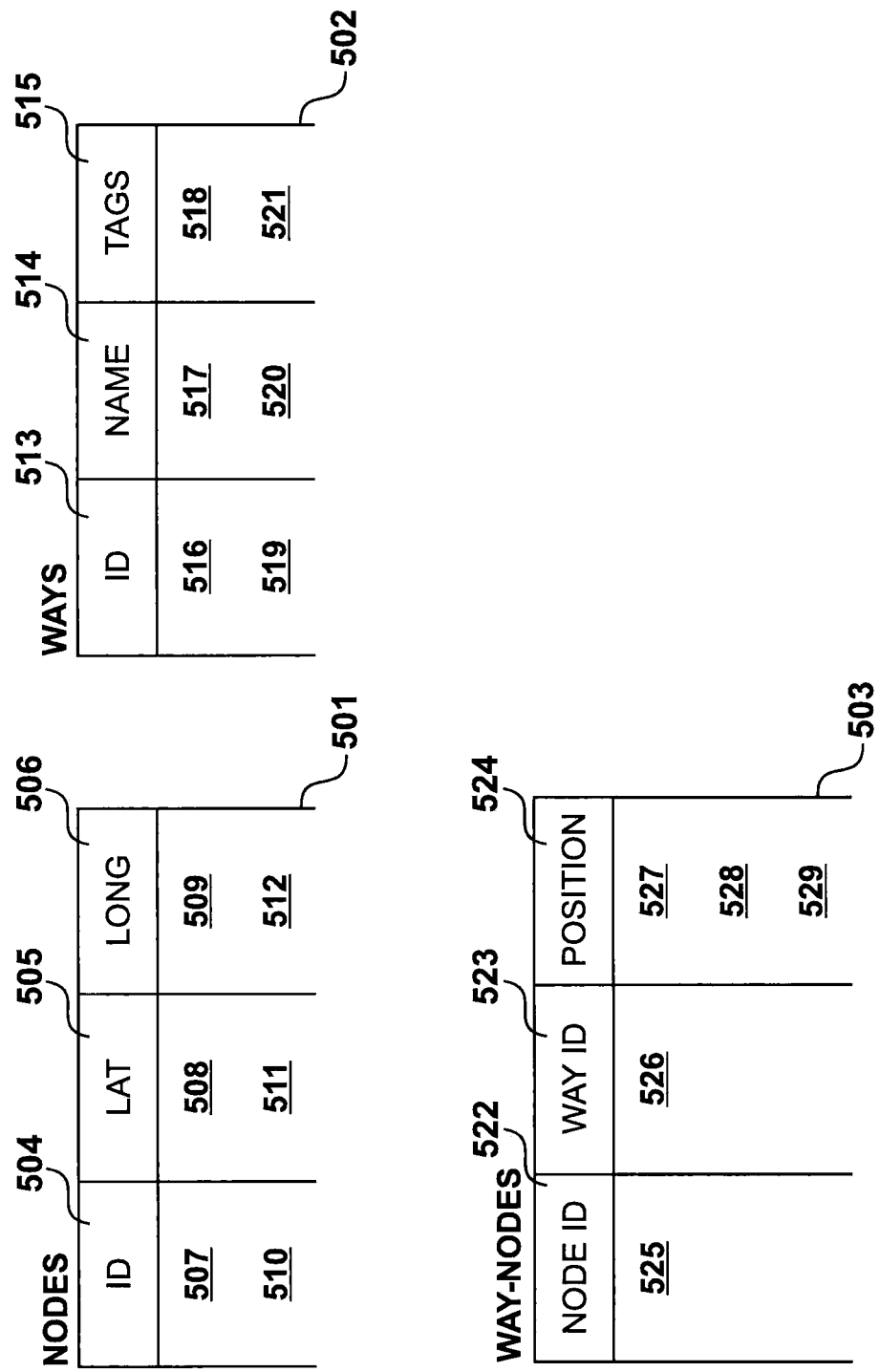
FIG. 5 illustrates data defining the details of a map.

Data defining the details of a map may be downloaded from available sources in a database form, as illustrated in FIG. 5. Data of this type is often available via an application program interface (API) to facilitate the inclusion of geographic references within other applications. The data is not stored, transmitted or manipulated in graphical form but, for ease of illustration, it is shown in graphical form in FIG. 6. This differs from the "graph" shown in FIG. 7; the latter having attributes consistent with graph theory.

Known and available map data comprises data arranged in three tables, specifically: a node table 501, a way table 502 and a way-node table 503. The node table 501 includes a first column 504 for a node identification (ID), a second column 505 for a latitude value (lat) and a third column 506 for a longitude value (long). Thus a first ID 507 is located at a first location (lat 508, long 509) and a second ID 510 is located at a second location (lat 511 and long 512). The node data just represents interesting locations in the geography.

The way table 502 specifies the nature of the roads and other transportation routes. This includes travel speed, from which journey times may be assessed, without detailing an actual location. A first column 513 identifies a way ID, a second column 514 provides a name and a third column 515 includes tags. In some data-sets, an additional tag table is included to define further attributes of a tag.

A first way 516 has a first name 517 and a first tag 518. Similarly, a second way 519 has a second name 520 and a second tag 521. The first name 517 and the second name 520 could be the same, representing the same road name that extends on both sides of a junction. For major roads, usually identified by a route number, the name could occur many times.

The way-node table defines the overall topology by relating the ways to the nodes. A first column 522 defines a node ID and a second column 523 provides a way ID. Thus a way, having way ID 526, starts at node 525. Subsequent nodes 527, 528, 529 are specified in a position column 524. Thus the table 503 of way-nodes identifies a node ID and a way ID, along with locations that sequentially define a path.

FIG. 6

Within the system, in order to configure the computer servers and programmable handheld devices to operate in an enhanced technical way, the data is stored numerically; as illustrated in FIG. 5. From this, graph data is generated that is also stored numerically. However, for the purposes of illustration, a small example of map data is shown as a more conventional looking map in FIG. 6.

Figure 6:
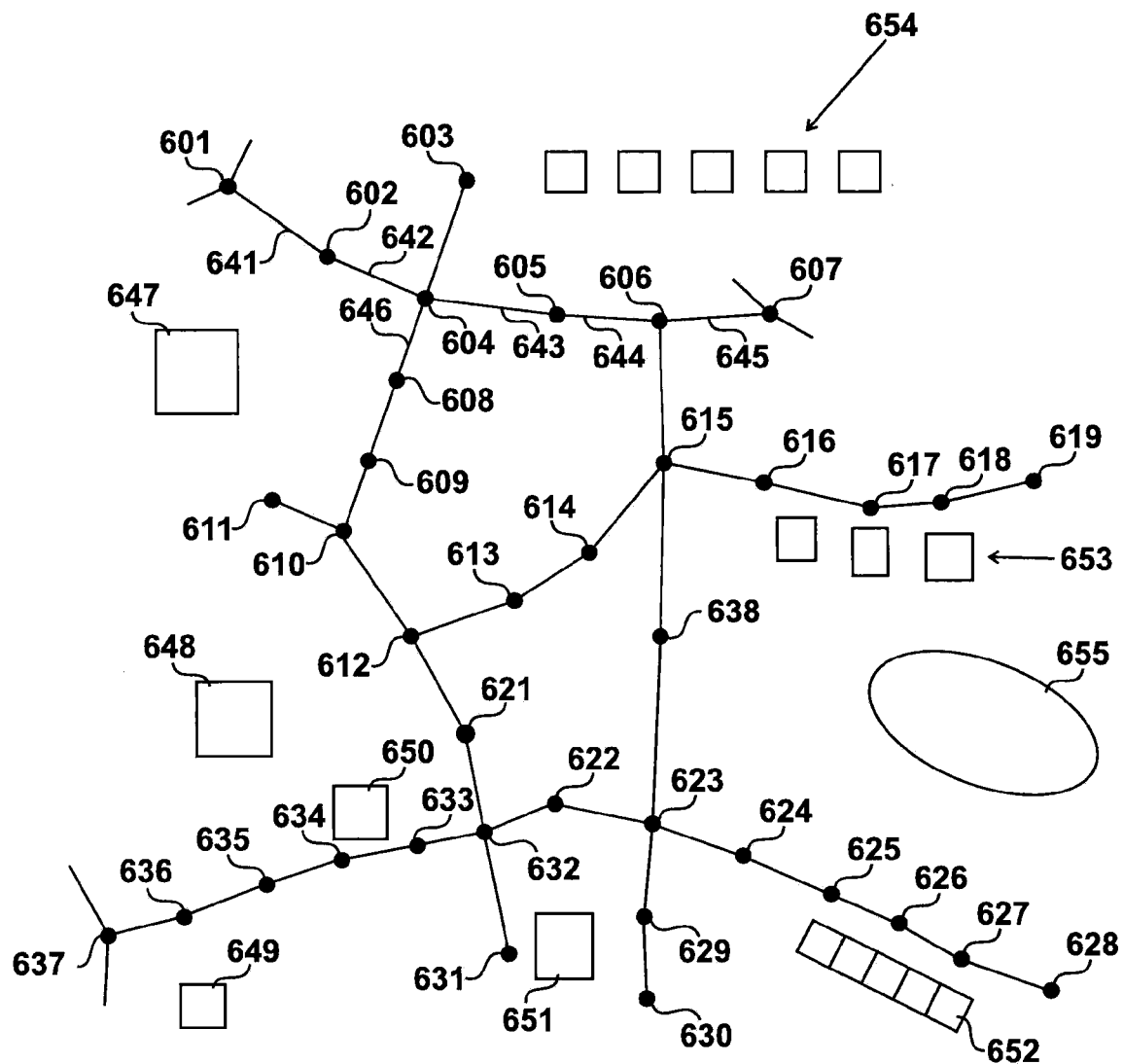
FIG. 6 shows the map data of FIG. 5 as a more conventional looking map.

For the purposes of this example, the map illustrated in FIG. 6 shows connected road, that are relevant for calculating travel times when walking or when travelling by road. In an embodiment, the geography may also be considered with respect to travelling by overground train or subway train and an alternative train network will be displayed. However, whether the nodes represent road intersections or railway stations, the subsequent processing to produce graph data is substantially similar. Thus, for the purposes of this example, the road related map will be described that will be considered as defining potential graph nodes for the subsequently generated graph data.

Map nodes 601 to 637 are connected by ways; ways 641 to 646 are identified in FIG. 6. From this small example it can be seen that for an area of interest, such as a city, the volume of map data becomes large. Many of the nodes do not contain data that is relevant to travel time calculations and many consecutive ways will have similar travelling properties.

A problem therefore exists in terms of how to configure the technical environment to process the available data in order to provide useful travel-time related output in a realistic time-frame using a realistic processing overhead.

In addition to the route data described above, the map data also includes other geographical features. In this example, these include buildings 647 to 654, along with a pond 655.

FIG. 7

Figure 7:
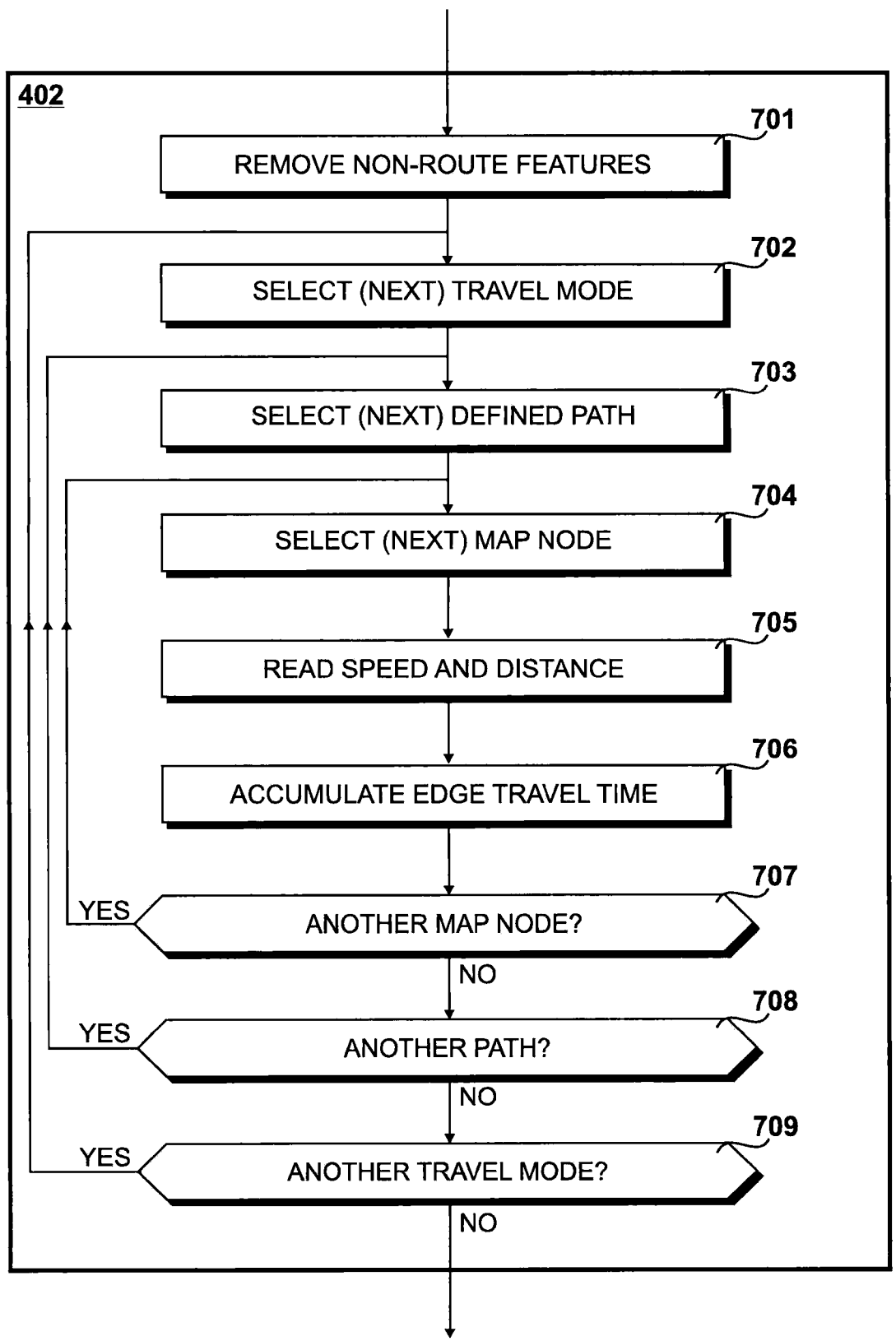
FIG. 7 shows procedures for processing the map data of FIG. 5.

Procedure 402 for processing the map data to produce graph data sets is detailed in FIG. 7. At step 701 non-route features are removed from the map data. In this example, this would include buildings 647 to 654 and the pond 655 etc. Any geographical feature that does not relate to travelling by any of the modes of transport under consideration is not required and is therefore removed in an embodiment in order to reduce data volume.

At step 702 a mode of travel is selected. In an embodiment, three modes of travel are considered in turn, namely, walking, travelling by road and travelling by subway train. Other modes could be included. Thus, in this example, the process is repeated three times to produce three distinct data sets. The topology of the data sets for walking or travelling by car will be similar but account will be taken of the fact that one way streets may exist and some paths may be accessible only by walking. Similarly, it will be understood that freeways would only be accessible to motor vehicles. For the purposes of this example, the walking example will be considered in detail.

At step 703 a path is selected and at step 704 a map node on the selected path is selected. At step 705 travel speed and distance to the next map node (selected at step 704) is considered in order to calculate a journey time (for the particular mode of travel under consideration). At step 706 the journey time is accumulated for the particular path selected at step 703.

At step 707 a question is asked to whether another map node is to be considered and when answered in the affirmative the next map node is selected at step 704.

If the question asked at step 707 is answered in the negative, a question is asked at step 708 as to whether another path is to be considered. When answered in the affirmative, the next defined path is selected at step 703.

If the question asked at step 708 is answered in the negative, a question is asked at step 709 as to whether another mode of travel is to be considered. If answered in the affirmative, the next mode of travel is selected at step 702.

FIG. 8

Figure 8:
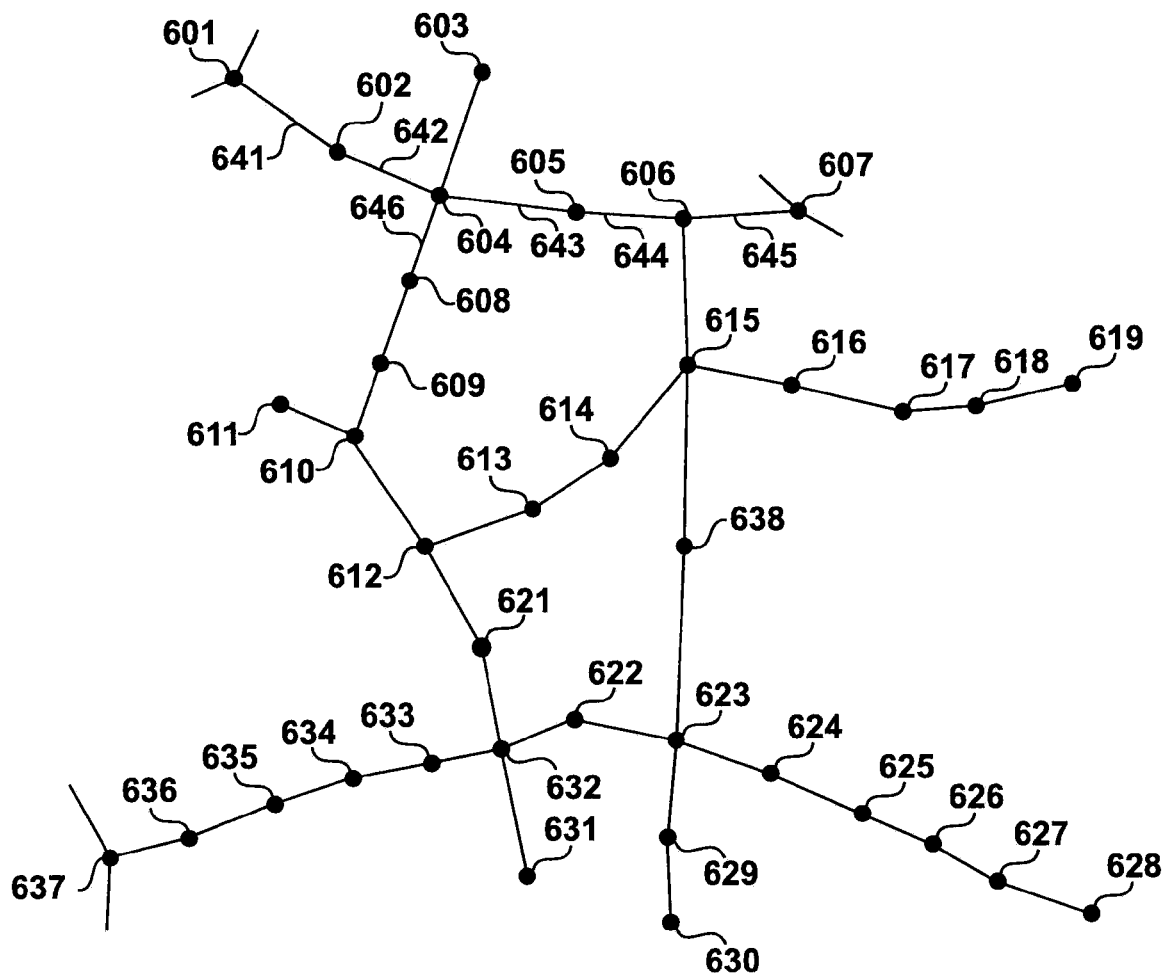
FIG. 8 shows the map of FIG. 6 with features removed.

A representation of the map data of FIG. 6 is shown in FIG. 8, after the application of step 701 in order to remove non-route features. As previously described, a travel mode is selected at step 702 and on a first iteration the walking mode of travel will be selected. For the purposes of this example, a walking speed of three miles per hour is assumed from which, given a particular distance, it is possible to calculate a travel time.

In an embodiment, when considering the geography, subsequent steps are performed by initially selecting intersections from the top left corner and working towards the bottom right corner until all of the paths have been considered. Thus, following this approach, a first intersection 601 will be identified. This defines a path to a second intersection 604, therefore a travel time can be calculated between the first intersection 601 and the second intersection 604.

At step 704 the next map node is selected which, in this example, will be node 602. From the map data, the distance between map node 601 and map node 602 is known therefore it is possible to calculate a journey time. Thus, a journey time is calculated at step 705 and accumulated at step 706. The question asked at step 707 will then be answered in the affirmative resulting in node 604 being selected. Again, the journey time is calculated from map node 602 to map node 604 and the journey time from map node 601 to map node 604 is accumulated.

For the path under consideration, the question asked at step 707 will be answered in the negative resulting in the next path being selected at step 708. Thus, on the next iteration a journey time from map node 604 to map node 603 will be calculated. Next, a journey time from map node 604 to map node 606 may be calculated, taking account of map node 605. Similarly a journey time from map node 604 to map node 610 will take account of the individual steps through map node 608 and map node 609.

The topology of the resulting graph will be dependent upon the intersections, that are treated as graph nodes. Map nodes that do not represent intersections, such as map node 641, provide an important function of defining the distance of the way or path under consideration and as such provide for the accurate calculation of journey time. However, having accumulated journey times between intersections, these intermediate map nodes are no longer required.

FIG. 9

Figure 9:
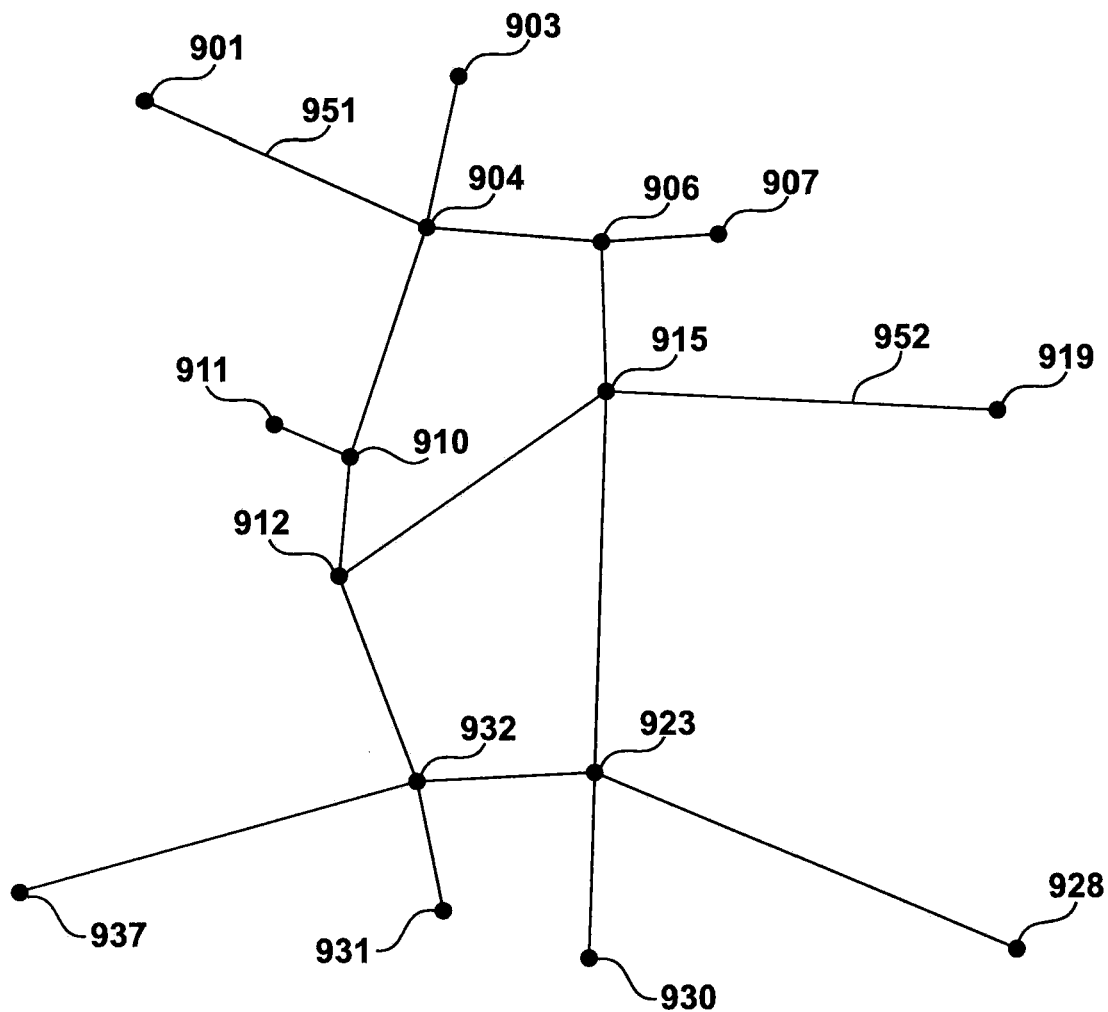
FIG. 9 illustrates a graph data-set.

A graph data set is illustrated in FIG. 9, derived from the processed map data of FIG. 8 by means of process 402. As can be seen in the example, map node 601 has been retained as graph node 901 which then connects with graph node 904, derived from map node 604. An edge 951 connects graph node 901 with graph node 904 and has data associated therewith representing a travel time between graph node 901 and graph node 904. Similarly, graph nodes 903, 906, 907, 911, 910, 915, 919, 912, 932, 923, 937, 931, 930 and 928 have been produced from similarly numbered (less 300) map nodes, as shown in FIG. 9.

The graph nodes shown in FIG. 9 are connected by edges, such as edge 952 connecting graph node 915 with graph node 919. A travel time is associated with edge 952 representing the time taken to travel between node 915 and node 919 using the selected mode of travel. Thus, in an embodiment, a graph data set of the type shown in FIG. 9 is generated for travelling by car, a second graph data set is generated for travelling on foot and a third graph data set is generated, with a different topology, for travelling by subway train.

Figure 22:
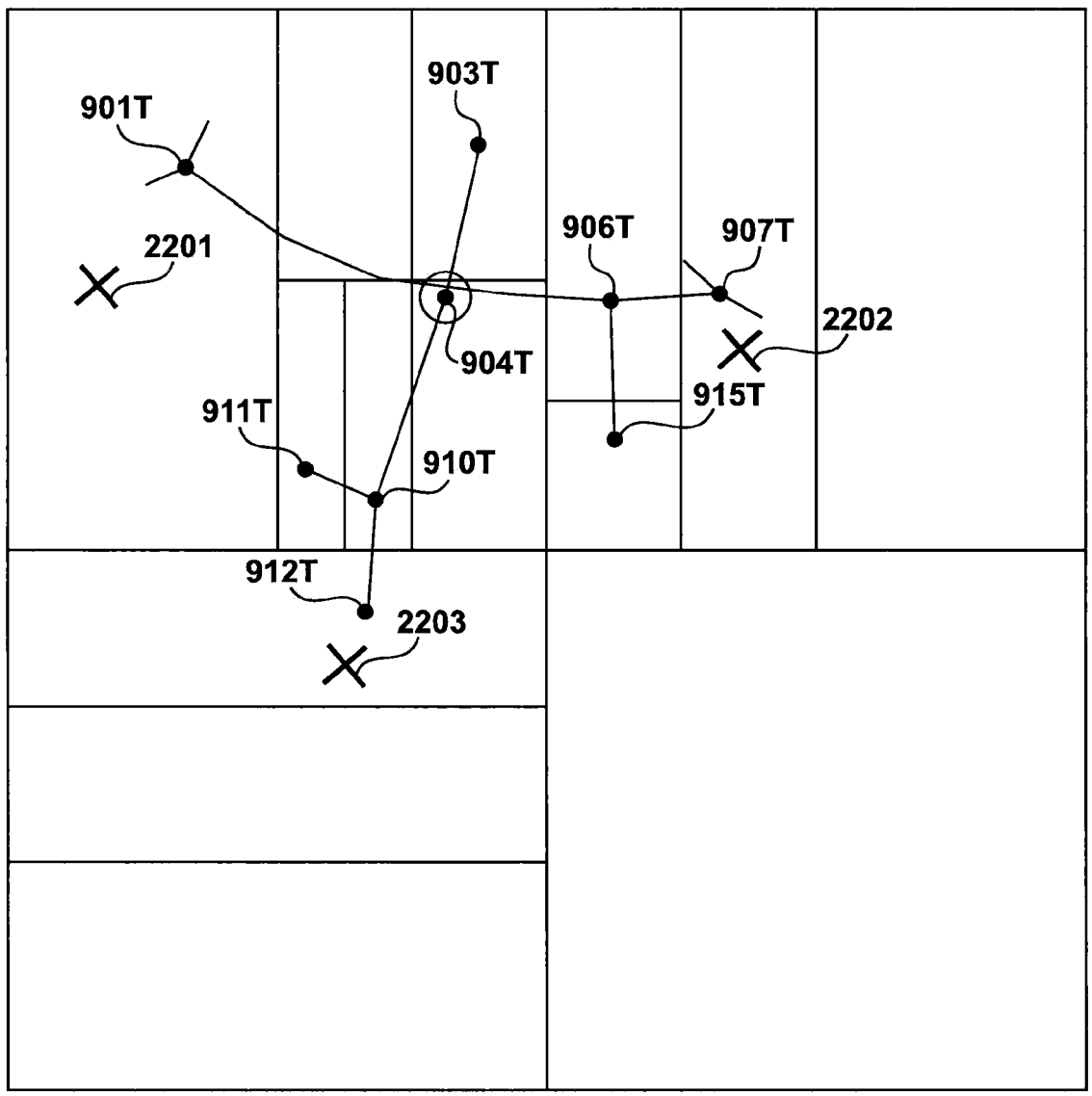
FIG. 22 shows an example of temporary graph.
Figure 23:
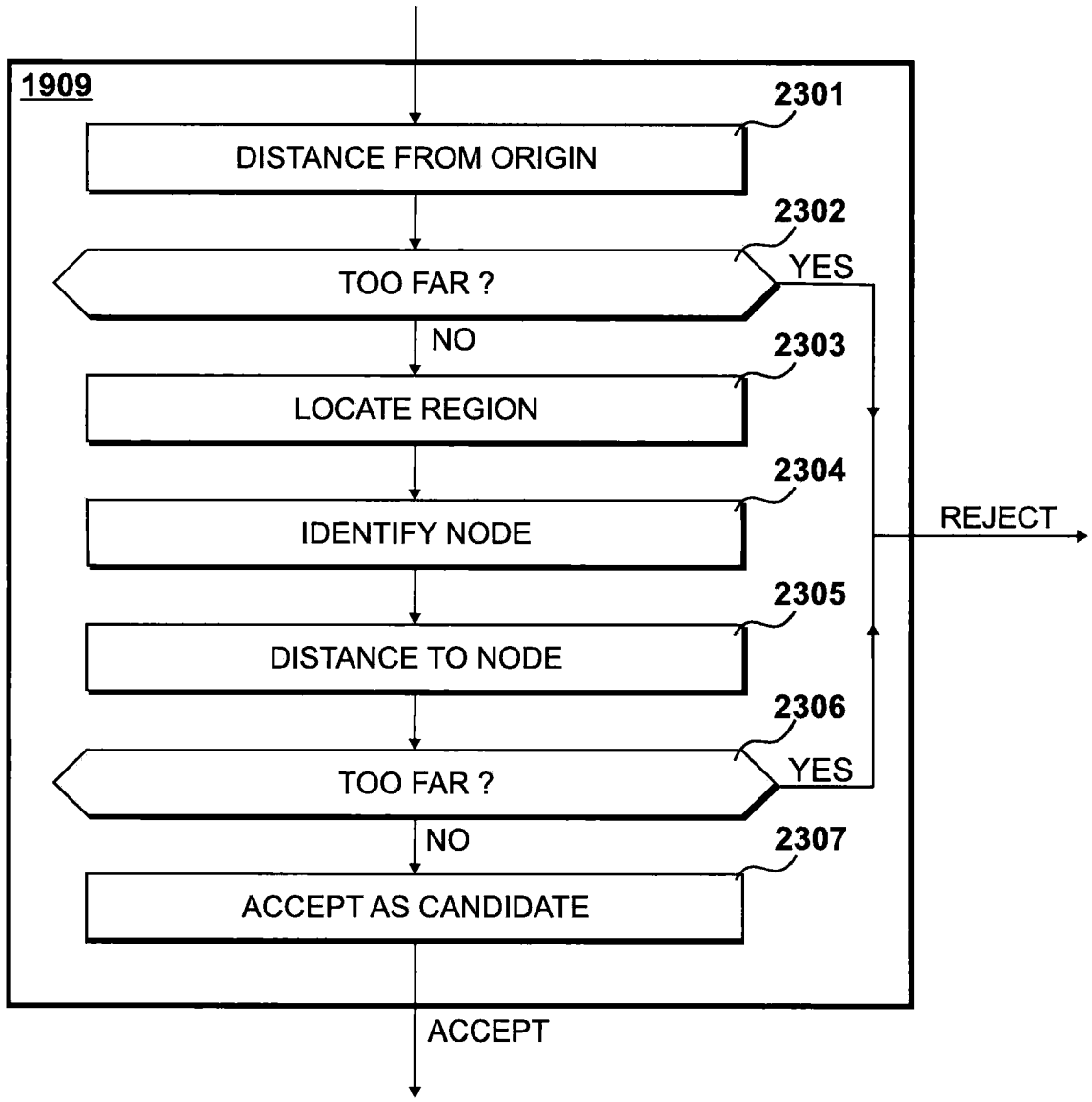
FIG. 23 shows procedures for determining whether a candidate destination may be accepted as identified in FIG. 19.

In an embodiment, the data associated with the edges does not represent an absolute travel time but represents a variable travel time. Thus, the edges may represent variable travel times between adjacent nodes that are dependent upon a temporal component derived non-exclusively from one or more of the following, comprising: time of day, day of the week, time of the year and special activity periods. A temporary graph, as described with respect to FIGS. 22 and 23, is then built with reference to a time of travel so as to account for the temporal component. Furthermore, in an embodiment, it would also be possible for real-time updates to be considered, such as those generated in response to accidents or other events.

The availability of public transport will tend to vary dependent upon the time of day and the day of the week. Modifications may also occur during holiday periods and special activity periods, such as when major sporting events take place in the locality.

FIG. 10

Procedures 403 for producing two-dimensional tree data are detailed in FIG. 10. In this example, a binary space partitioning tree data structure is produced by dividing a region of interest repeatedly until each sub region contains only one of said graph nodes. A worked example implementing the procedures of FIG. 10, acting upon the graph of FIG. 9, is described below with reference to FIGS. 11 to 16, resulting in the generation of an example of a binary space partitioning tree as shown in FIG. 17.

At step 1001 existing regions are identified and at step 1002 a region is selected. At step 1003 a question is asked as to whether more than one node exists within the region and when answered in the affirmative the region is divided in a binary fashion to create two leaves.

In an embodiment, the region of interest has been bounded and positions within the bound of region may be specified by Cartesian coordinates in the x direction and in the y direction. When divisions occur, the dividing line may be expressed as being equal to one of these dimensions being constant. Thus, divisions may occur along lines of constant y on a first iteration, followed by divisions along the lines of constant x on a second iteration.

After performing the division at step 1004, a question is asked at step 1006 as to whether another region is to be considered and when answered in the affirmative the next region is selected at step 1002.

When all of the regions have been considered, the question asked at step 1006 will be answered in the negative, whereafter a question is asked at step 1007 as to whether all of the leaves have been frozen.

Referring back to step 1003, a question is asked as to whether more than one node exists within the region and, as previously stated, when answered in the affirmative, a division occurs at step 1004. Alternatively, if the question asked at step 1003 is answered in the negative, to the effect that only one node does exist within the region, the leaf is frozen at step 1005. Thus, as further and further divisions occur, eventually only one exclusive node will exist within each region, resulting in the question asked at step 1007 being answered in the affirmative to the effect that all of the leaves have been frozen.

Before this situation occurs, the question asked at step 1007 will be answered in the negative, to the effect that not all of the leaves have been frozen, whereafter the orientation of division is changed at step 1008. Thus, after divisions along lines of constant y, for example, the change of orientation specified at step 1008 will result in further divisions occurring along lines of constant x.

In response to the question asked at step 1007 being answered in the affirmative, to the effect that all of the leaves are frozen, the tree is considered to be complete at step 1009, resulting in the generation of a data structure as represented in FIG. 17.

FIG. 11

Figure 11:
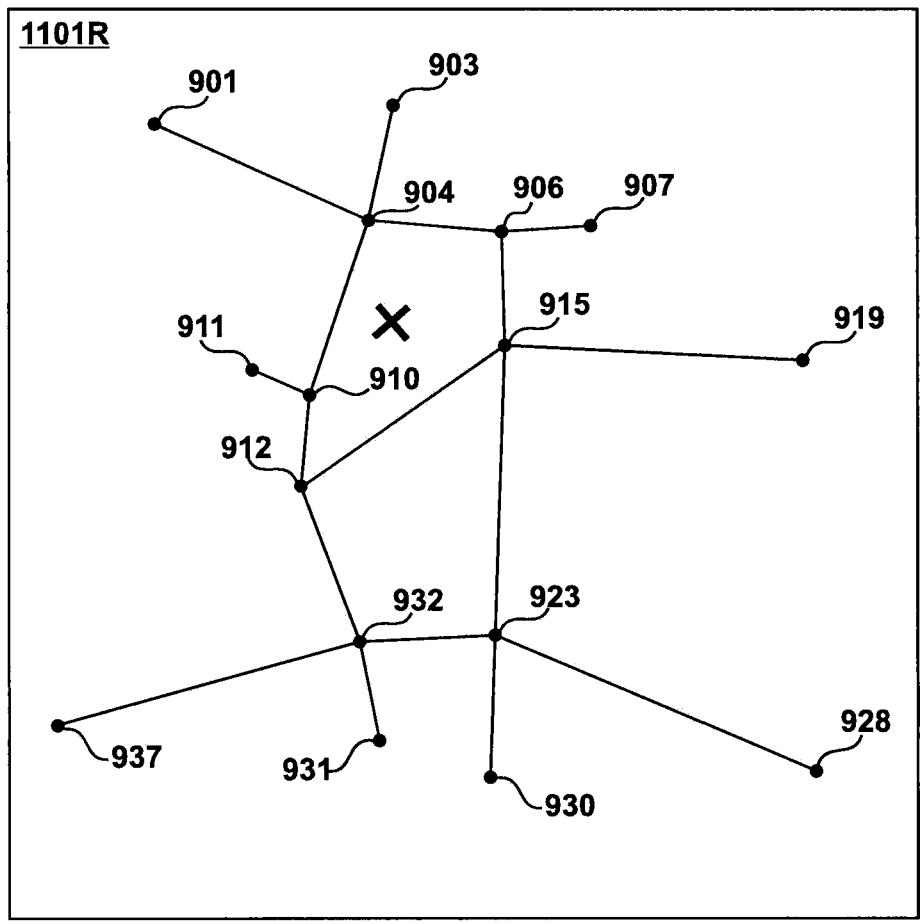
FIG. 11 shows the graph of FIG. 9 within a bounded region.

The graph of FIG. 9 is shown in FIG. 11. A bounded region 1101R has been defined, such that all of the nodes are contained within region 1101R and all activities directed towards generating travel time data will be conducted with respect to positions contained within region 1101R.

Following the procedures identified in FIG. 10, region 1101R will be identified at step 1001 and selected at step 1002. The region contains many nodes therefore the question asked at step 1003 will be answered in the affirmative and the region 1101R will be divided.

FIG. 12

Figure 12:
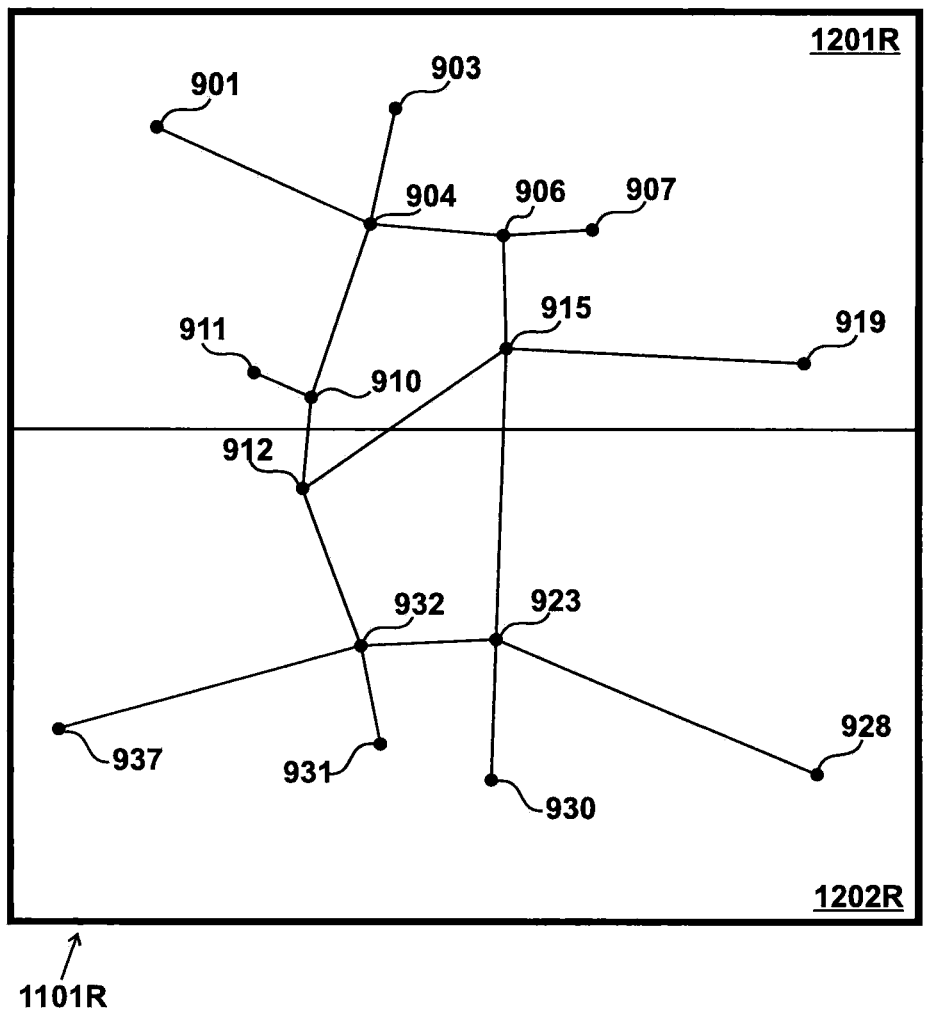
FIG. 12 shows the region of FIG. 11 further subdivided.
Figure 13:
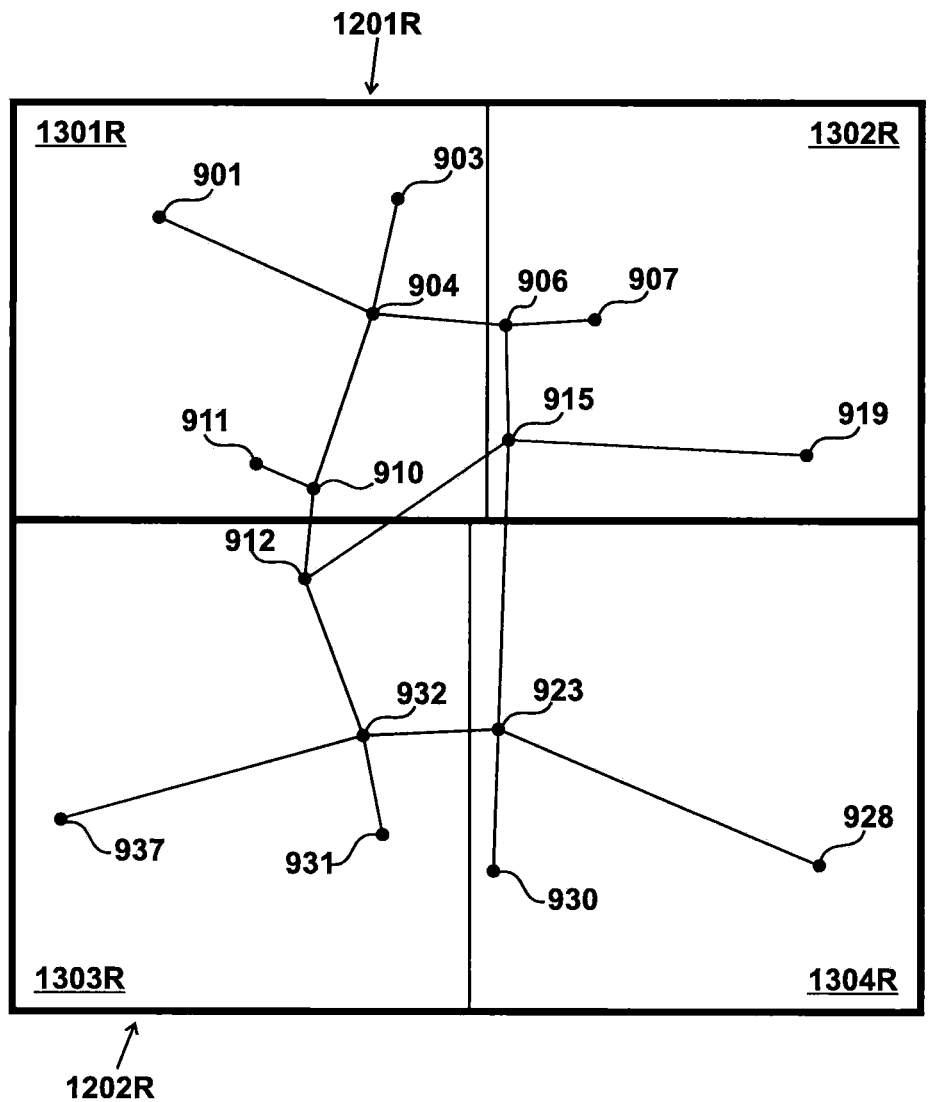
FIG. 13 shows the regions of FIG. 12 further subdivided.
Figure 14:
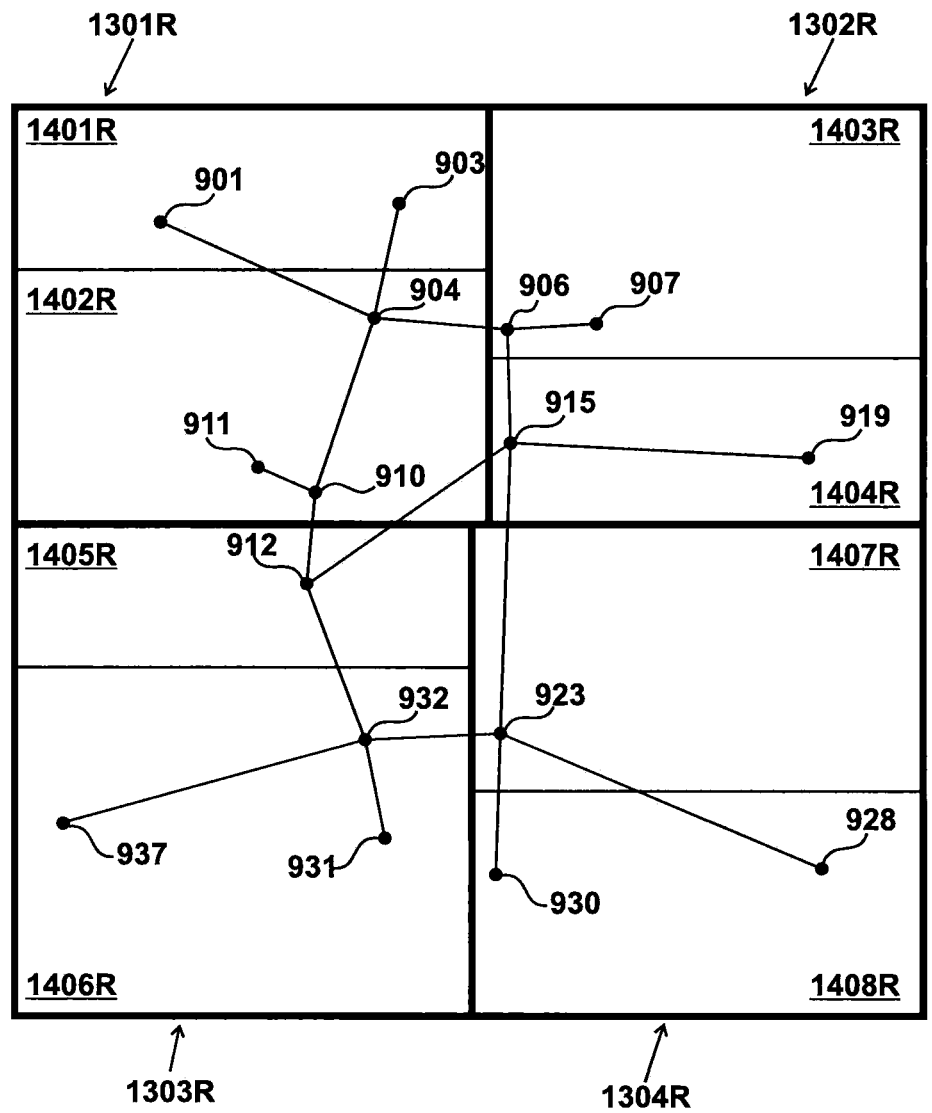
FIG. 14 shows the regions of FIG. 13 further subdivided.
Figure 15:
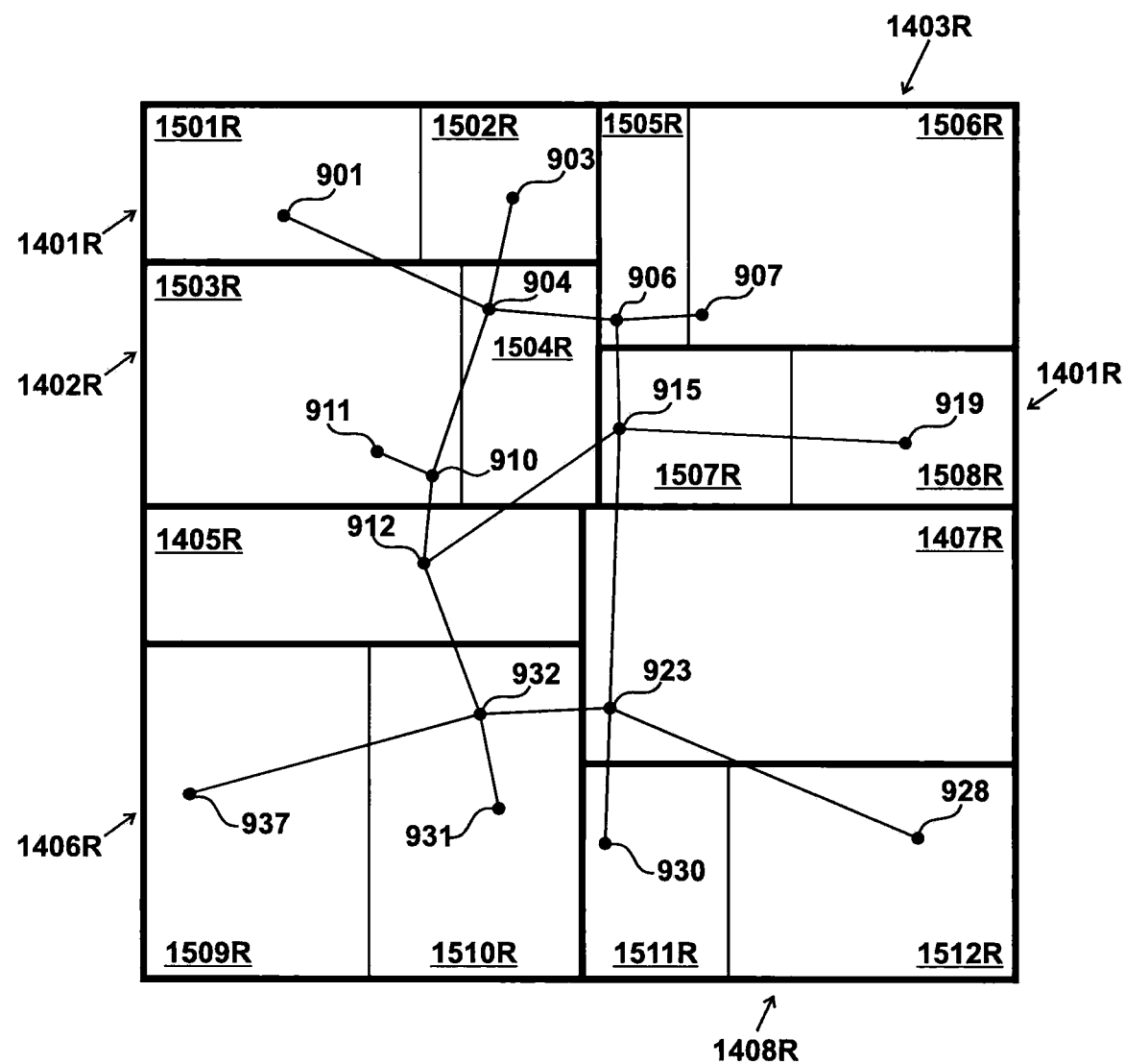
FIG. 15 shows the regions of FIG. 14 further subdivided.

As shown in FIG. 12, region 1101R has been divided into a first region 1201R and a second region 1202R. This represents the whole of the regions under consideration therefore the question asked at step 1006 will be answered in the negative. All of the leaves have not been frozen (none of the leaves have been frozen at this stage) therefore the question asked at step 1007 will be answered in the negative and the orientation will be changed at step 1008. At step 1001, first region 1201R is identified, along with second region 1202R.

At step 1002 region 1201R is selected and the question asked at step 1003 is answered in the affirmative, to the effect that more than one node exists within the region, resulting in the region being divided vertically. The actual position of the division may be selected in order to balance the number of nodes contained on either side of the division and many algorithms are known for providing varying degrees of balance. In many known algorithms, tradeoffs exists in terms of balancing optimisation and speed of execution. In this example, the procedures described are effectively pre-processes performed in order to allow an environment to be created which can then be used for online searching. Thus, the first stages of pre-processing may be optimised and do not necessarily have to be performed quickly because they are preformed as a one off pre-process. However when actual online searching is being performed, this trade-off shifts to the opposite extreme, in that speed of execution becomes preferred and measures are encouraged that reduce overall processor overhead.

To continue with this example, the question asked at step 1006 will be answered in the affirmative resulting in region 1202R being selected at step 1002 and again divided at step 1004.

FIG. 13

The subdivision of region 1201R results in the creation of a first region 1301R and a second region 1302R. The division of region 1202R results in the creation of a third region 1303R and a fourth region 1304R. None of the leaves have been frozen therefore the orientation will again change at step 1008 resulting in the first, second, third and fourth regions being identified at step 1001 and the first region 1301R being selected at step 1002. Further divisions occur, this time along lines of constant y.

FIG. 14

Following this further iteration, region 1301R has been divided into a first region 1401R and a second region 1402R. Region 1302R has been divided into a third region 1403R and a fourth region 1404R. Similarly, region 1303R has been divided into fifth region 1405R and sixth region 1406R. Region 1304R has been divided into seventh region 1407R and eighth region 1408R. At this stage, none of the leaves have been frozen but it should be noted that region 1405R and region 1407R both only contain one node. Thus, the orientation is again changed at step 1008 to perform further divisions along lines of constant x.

FIG. 15

Having identified regions at step 1001, region 1401R is selected and divided to create a first region 1501R and a second region 1502R. Similarly, region 1402R is divided to create region 1503R and region 1504R. Region 1403R is divided to create region 1505R and region 1506R. Region 1404R is divided to create region 1507R and region 1508R. Region 1405R is frozen because the question asked at step 1003 is answered in the negative. Region 1406R is divided to create region 1509R and region 1510R. The question asked at step 1003 is again answered in the negative when considering region 1407R therefore this region is frozen. When region 1408R is selected this is divided to create region 1511R and region 1512R.

FIG. 16

Upon the next iteration, most of the leaves are identified as being frozen. However, region 1503R is divided into region 1601R and region 1602R and region 151 OR is divided into 1603R and region 1604R.

Upon the next iteration, regions 1601R, 1602R, 1603R and 1604R will be frozen. Thereafter, all of the regions will be identified as frozen and the space will have been fully divided.

FIG. 17

The execution of the procedure shown in FIG. 10 and as illustrated by example with reference to FIGS. 11 to 16, results in the generation of a binary space partitioning tree data structure. An example of such a data structure is illustrated in FIG. 17, reflecting the geometry shown in FIG. 16.

Figure 16:
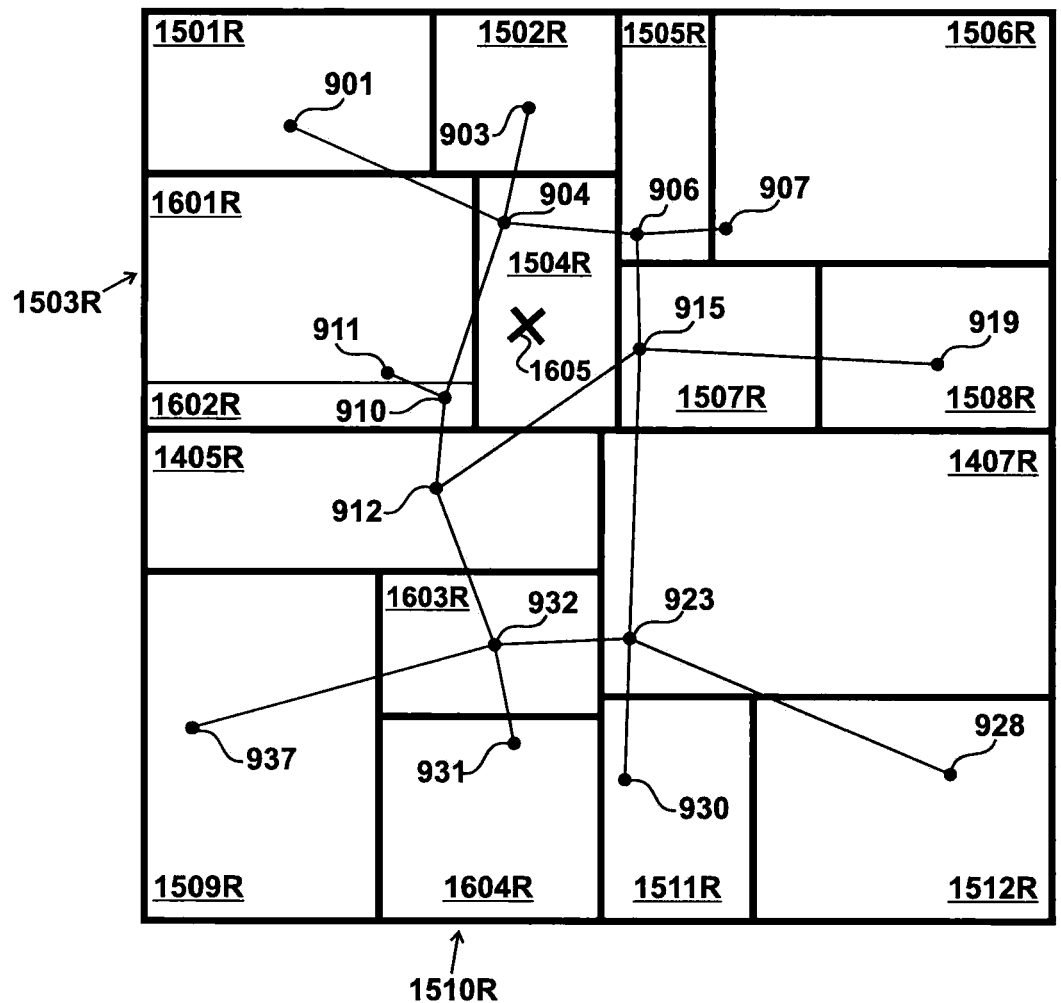
FIG. 16 shows the regions of FIG. 15 further subdivided.
Figure 17:
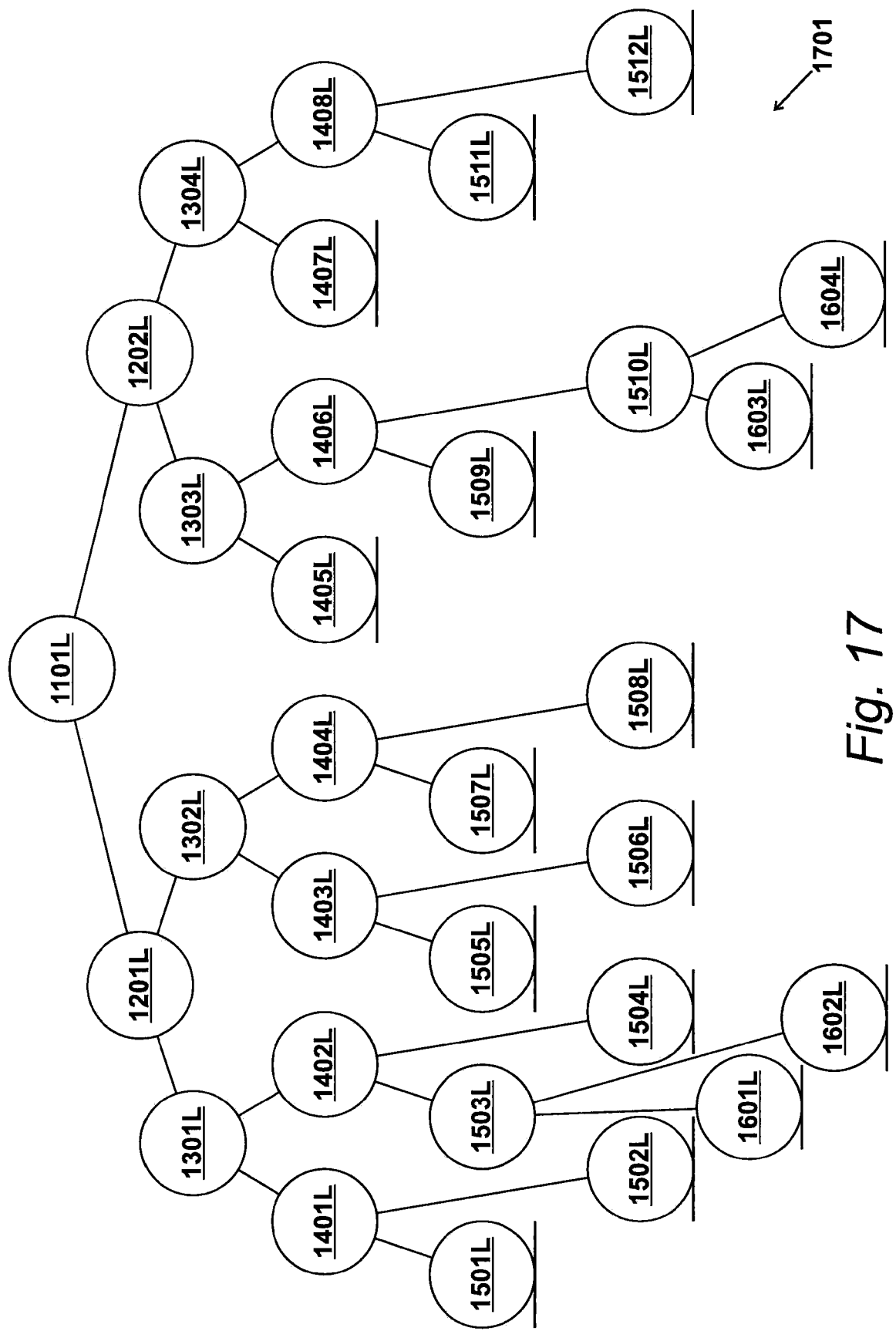
FIG. 17 illustrates an example of a binary space partitioning tree data structure.

Each region containing only one node, as shown in FIG. 16, has a respective frozen leaf in FIG. 17. Thus, the frozen leaves are identified as 1501L, 1502L, 1601L, 1602L, 1504L, 1505L, 1506L, 1507L, 1508L, 1405L, 1509L, 1603L, 1604L, 1407L, 1511L and 1512L. Working backwards up the tree, frozen leaves 1501L and 1502L make up region 1401R, as shown by branch 1401L. This in combination with branch 1402L make up branch 1301L. Similarly, branch 1301L with branch 1302L make up branch 1201L which in combination with branch 1202L makes up the totality of the space, represented as branch 1101L.

The tree is used to identify, (for any particular coordinate location within the region 1101R) its sub region, as identified by a frozen leaf. For the purposes of this example, a starting location 1605 is identified in FIG. 16. Thus, the coordinate location of starting position 1605 is known but a question arises as to which sub region does it belong.

At branch 1101L a decision is taken as to whether the starting location 1605 lies within branch 1201L or branch 1202L. Within each branch, ranges are specified in the x dimension and in the y dimension; that are compared against the coordinate location of starting location 1605. Thus it falls within branch 1201L and then within branch 1301L, and then within branch 1402L and finally within frozen leave 1504L. Thus, it can be appreciated that a substantial overhead exists in terms of creating the tree structure of FIG. 7. However, during online operation, when it becomes necessary to identify the smallest region to which a location belongs, the binary space partitioning tree approach allows this evaluation to be done substantially quicker.

FIG. 18

Each smallest region shown in FIG. 16 is associated with a single exclusive node within the overall graph data. Thus, for example, node 923 is the only node within region 1407R. The table shown in FIG. 18 allows the associated node to be identified, having identified the region of interest. Thus, if a location of interest falls within region 1407R, the table 1801 identifies node 923 associated with this region.

To achieve this, a first column 1802 identifies regions and a second column 1803 identifies their associated nodes. Thus, a quick lookup is provided in order to identify associated nodes when this information is required.

FIG. 19

Having generated the data structures, primarily consisting of the graph data sets and the two-dimensional tree data, it is now possible to perform a search, as identified at step 405.

In an embodiment, travel time data is generated by receiving coordinates for a starting location, receiving a maximum travel time and reading processed graph data, comprising nodes representing pre-filtered map features and edges representing travel times betweens said nodes. These travel times may be set, or the travel times may be dependent upon a temporal component. A temporary graph is built of selected nodes that can be reached via selected edges within the maximum travel time. Candidate destinations are received and the travel time to each candidate destination is tested with reference to the temporary graph.

A start location is received at step 1901 which, for the purpose of this example, may be considered as starting location 1605. A question is asked at step 1902 as to whether this starting location can be accepted and when answered in the negative, it is not possible for the search to be performed resulting in the question at step 406 being asked as to whether another search is to be performed.

If the question asked at step 1902 is answered in the affirmative, data identifying the maximum travel time is received at step 1903. Thus, for example, if walking, a maximum travel time of ten minutes may be specified or if using public transport a maximum travel time of forty minutes may be specified. However, in an embodiment, all candidates lying within this travel time are identified and these may be ranked so as to identify the candidate destination that will take the least amount of time to reach by the selected mode of transport or transportations available. Again, a question is asked at step 1904 as to whether the maximum travel time is considered to be acceptable. In an embodiment, the travel time may be rejected if it is ridiculously low, say less than thirty seconds or ridiculously high say more than six hours. However, these limits may be adjusted dependent upon the geography and the available modes of transport.

In an embodiment, the evaluations are sensitive to temporal factors therefore at step 1905 the start time is received. In an embodiment, these start times may be read from a local clock or alternatively, a start time may be specified by a user on the basis that they wish to commence the journey after a predetermined delay. At step 1906 a question is asked as to whether the start time is accepted and again the search is terminated if the start time is not considered to be acceptable. In an embodiment, for example, a start time that is more than six hours into the future may be considered unacceptable.

Having received an acceptable starting location, an acceptable maximum travel time and an acceptable start time, a temporary graph is built at step 1907. Having built the temporary graph, it is now possible to receive candidate destinations and from this populate a list.

At step 1908 a candidate destination is received and a question is asked at step 1909 as to whether the destination is acceptable. If answered in the negative, the candidate is rejected and the next candidate is considered, when received at step 1908.

If the question asked at step 1909 is answered in the affirmative, the candidate is added to a candidate list at step 1910 and a question is then asked at step 1911 as to whether another candidate is to be considered. Thus, when the question asked at step 1911 is answered in the affirmative, the next candidate is received at step 1908. When the question asked at step 1911 is answered in the negative, to the effect that no further candidates are to be considered, the list is sorted at step 1912 in order of shortest travel time.

FIG. 20

Figure 20:
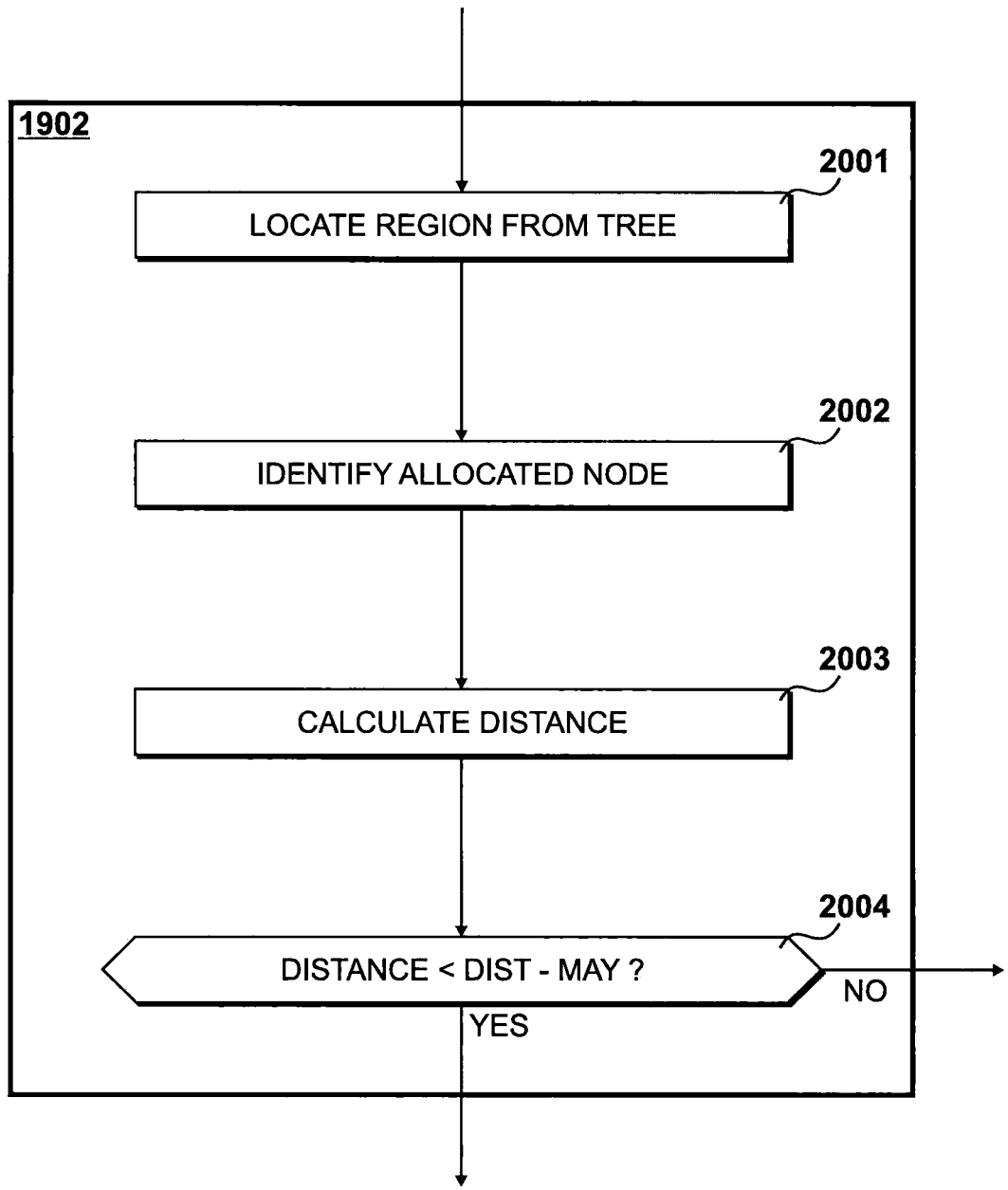
FIG. 20 shows procedures for judging the acceptability of a start location, identified in FIG. 19.

Procedures 1902 for judging the acceptability of a start location are detailed in FIG. 20. The coordinates of an actual starting location are transformed to a modified origin at the location of a node in the processed graph data. Furthermore, a starting location may be rejected if the actual location is too far away from its respective modified origin. Thus, in an example, the starting location may be rejected and hence the search cancelled, if the actual starting location is more than three hundred feet away from the modified origin.

At step 2001 a region is located from the tree of FIG. 17. The starting location 1605 is identified as being in region 1504R. Referring to table 1801 of FIG. 18, this results in the starting location 1605 being translated to modified origin 904. Thus, a graph node is allocated at step 2002.

At step 2003 the distance from the allocated node or modified origin to the actual starting location is calculated and a question is then asked at step 2004 as to whether the actual distance is smaller than a maximum distance. If answered in the affirmative, the search continues but if answered in the negative, to the effect that the distance is larger than the maximum allowed distance, the search terminates.

In the example described, the retained nodes, that is those present in the graph data, are present because they represent major geographical features such as road interchanges or railway stations. If these are adopted as the only graph nodes, it is possible that there will be an insufficient number of graph nodes within the overall geography, resulting in the smallest leaf regions being too large and too many searches being rejected. Thus, in an embodiment, it may be possible to adopt other features which in turn become graph nodes and thereby increase the number of frozen leaf regions present within the geography so as to reduce the overall size of each of these regions and thereby accommodate an optimum number of searches. This may be considered as a "grade of service" parameter which, for example, may specify that the fragmentation of the regions should be such as to ensure that at least ninety-five percent of search requests are satisfied.

FIG. 21

Figure 21:
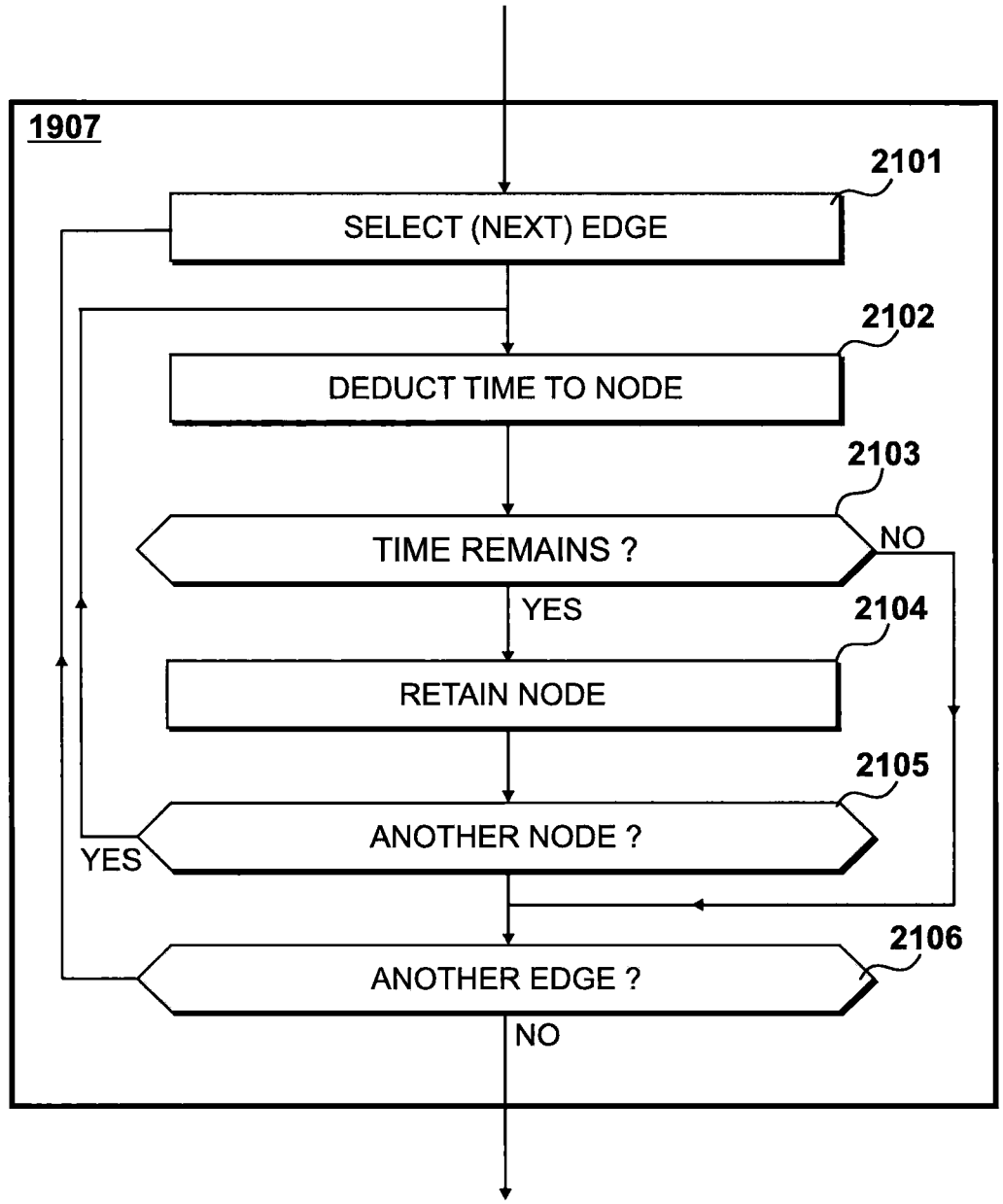
FIG. 21 shows procedures for building a temporary graph as identified in FIG. 19.

Procedures 1907 for building a temporary graph are detailed in FIG. 21. Starting from the origin, at step 2101 an edge is selected, connecting the origin to a first node. A maximum travel time is known and a travel time from the origin to the selected node is known, via the edge selected at step 2101, therefore the travel time for the edge is subtracted from the maximum travel time. A question is asked at step 2103 as to whether any time remains, that is to say, the result of the previous subtraction remains positive. Thus, if the question asked at step 2103 is answered in the affirmative, the node is retained at step 2104. Thus, in this way, the node selected from the graph of FIG. 16 is added to the build of the temporary graph, as illustrated in FIG. 22.

A question is then asked at step 2105 as to whether another node is present along the selected edge and when answered in the affirmative, the node is selected and the time taken to travel to this node is deducted at step 2102. Again, at step 2103 a question is asked as to whether time remains and on this occasion, for example, the node may be beyond the allowed maximum travel time thereby resulting in the question asked at step 2103 being answered in the negative. Following this, the question is again asked at step 2106 as to whether another edge is present.

FIG. 22

An example of a temporary graph is shown in FIG. 22. In the previously described example, an actual starting location is identified as location 1605 in FIG. 16. This lies within region 1504R (determined by use of the tree structure of FIG. 17) which in turn contains node 904, determined by reference to table 1801 of FIG. 18. Node 904 therefore represents the starting location for the temporary graph, identified as 904T in FIG. 22. Referring back to FIG. 16, a first edge is selected which may be the edge connecting node 904 to node 901. An assessment is made to the effect that it is possible to travel to node 901 within the maximum travel time therefore node 901 is retained and is shown as node 901T in the temporary graph of FIG. 22.

Further iterations of the procedures shown in FIG. 21 result in considerations being made with respect to the edges extending to nodes 903, 906 and 910 etc. Thus, for the purposes of this example, it is possible to reach node 903, therefore this is retained and built into the temporary graph as node 903T. Similarly, node 906 is retained as temporary node 906T and, on a first iteration it is found possible to retain node 907 and by a further operation it is possible to retain node 915. Thus, respectively, these are retained and built into the temporary graph as node 907T and node 915T. Similarly, node 910 is retained as node 910T, node 911 is retained as node 911T and node 912 is retained as node 912T. Thus, the temporary nodes shown in FIG. 22 represent the nodes where it is possible to travel to within the maximum allowed journey time. For all of the other nodes identified in FIG. 6, the necessary journey time would be longer than the maximum permitted. Thus, these are not built into the temporary graph.

Figure 19:
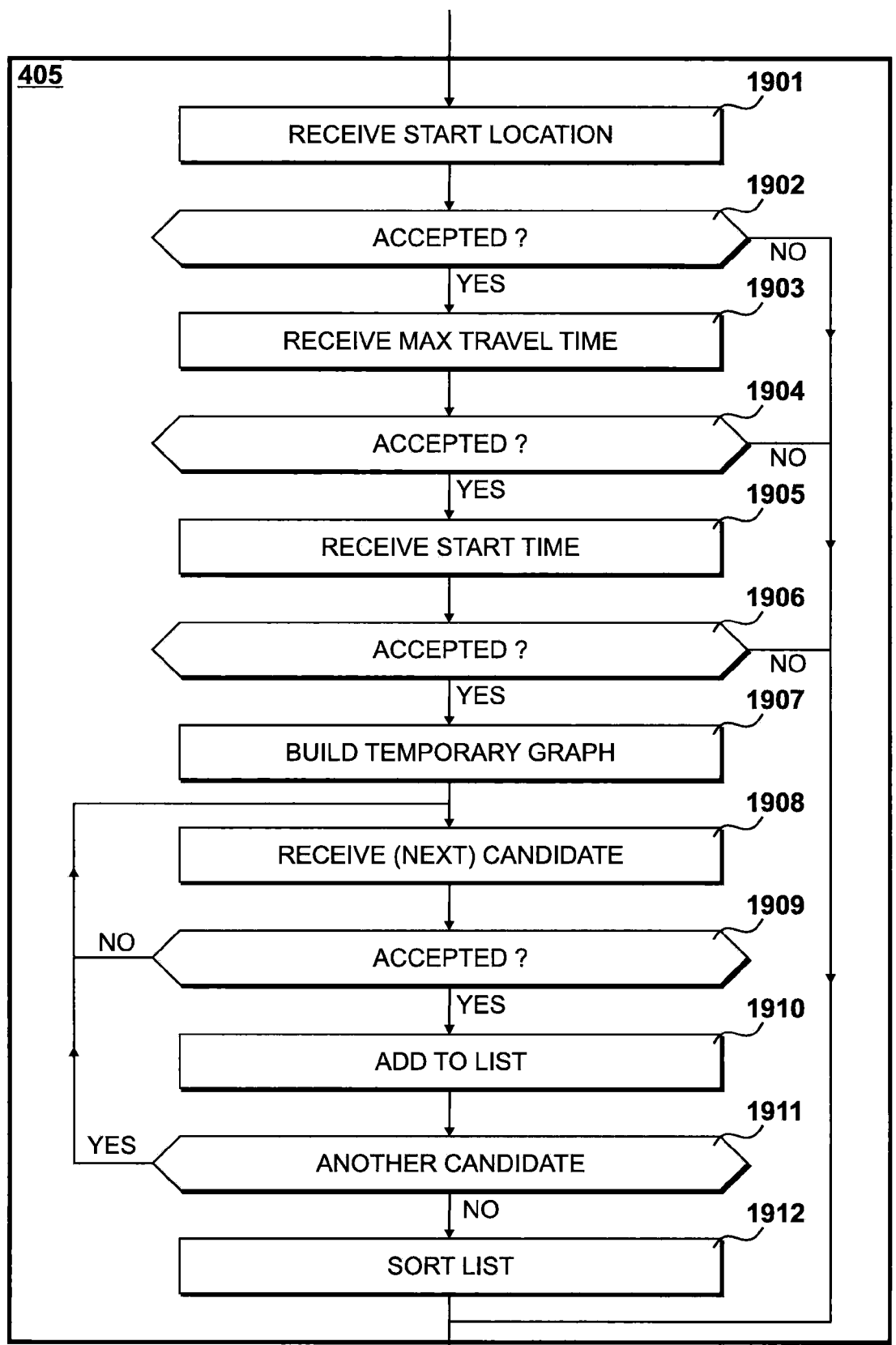
FIG. 19 illustrates procedures for performing a search.

For the purposes of this example, candidate destinations are shown at locations 2201, 2202 and 2203. The procedure of FIG. 19 now determines whether these candidate destinations may be accepted and then ranks them in terms of journey time.

It can therefore be appreciated that an embodiment of the invention provides a data structure that comprises selected nodes that can be reached via selected edges within a specified maximum journey time. The data structure is built from processed graph data, as shown in FIG. 16, and the processed graph data comprises nodes that represent pre-filtered map features, as shown in FIG. 6, and edges related to travel times between nodes. In an embodiment, the data structure is built dynamically in response to a search request, wherein the travel times between nodes are time and event sensitive.

FIG. 23

Procedures 1909 for determining whether a candidate destination may be accepted are detailed in FIG. 23. In an embodiment, the procedures of FIG. 23 are conducted as soon as details of a candidate destination have been received. Thus, these procedures may take priority over the building of the temporary graph structure in FIG. 22. The actual mechanism for achieving this will be dependent upon the nature of the processing environment. Thus, incoming data representing a candidate destination may create an interrupt so as to halt activities being conducted elsewhere. The other activities, possibly the generation of a temporary graph structure, could also be seen as a background activity, with the processing of incoming candidate destinations being identified as a foreground activity and thereby having a higher priority. In some environments, it may be possible to multi-thread these applications and with an appropriate hardware platform, it may be possible to perform a degree of parallel processing.

At step 2301 a calculation is made as to the actual distance of the candidate destination from the origin. This particular step does not make any reference to travel times but acts as a quick, crude filter to reject candidate destinations that clearly could not be reached within the travel time specified. Thus, if a candidate destination is considered to be too far away from the origin, the question asked at step 2302 is answered in the affirmative and the candidate is rejected.

If the question asked at step 2302 is answered in the negative, the region containing the candidate is located at step 2303. Thus, again reference is made to the tree structure of FIG. 17 and the table of FIG. 18. Thus, at step 2304 the relevant node is identified and at step 2305 a calculation is made to determine the distance between the location of the actual candidate and the location of its associated node. If this distance is considered to be too far, a question asked at step 2306 will be answered in the affirmative and again the candidate will be rejected. In an embodiment, this distance may be adjusted and, as an illustration, a distance of, say, three hundred feet may be selected.

If the question asked at step 2306 is answered in the negative, to the effect that the candidate destination is close enough to the node, the actual node is assumed to be the destination and the candidate is accepted at step 2307. Thus, as previously described, after acceptance, the candidate is added to a candidate list at step 1910 and this list is then sorted at step 1912 in order to present a journey time list to a user as illustrated in FIG. 2.

FIG. 24

In addition to selecting a preferred candidate from a relatively short list, as shown in FIG. 2, a substantially larger group of candidates may be displayed graphically. The graphical display of FIG. 24 has distinct improvements over a conventional isochronal representation. It is driven with respect to specific candidates of interest. Thus, the relevant information is clear and accurate. Furthermore, the computational overhead is reduced and the procedures involved focus the processing capabilities on the particular candidates of interest.

Figure 24:
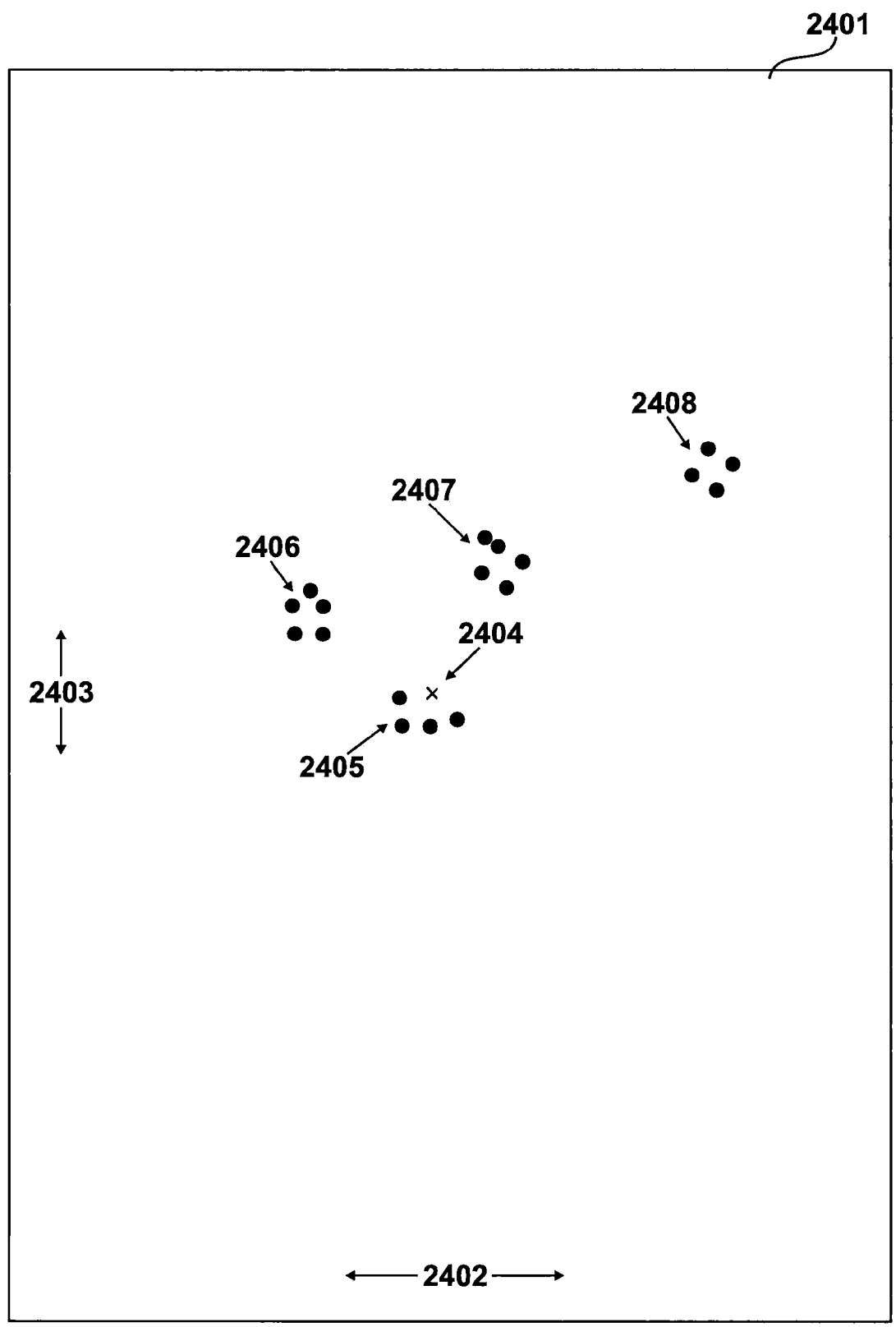
FIG. 24 shows a graphical display of an improved isochronal representation.

In FIG. 24, graphical display 2401 has a width 2402 and a height 2403. The area displayed is scaled to represent a geographical area of interest and the travel time related data may be placed over a conventional map of the area, possibly showing rivers and major streets etc.

In the example, an origin 2404 is shown. Several points are also shown representing candidates of interest that have a substantially similar journey time from origin 2404. In the example, four points 2405 are close. Three further groups 2406, 2407 and 2408 are shown. In an example, it may be possible, without private transport, to reach all of the points within ten minutes.

With reference purely to the geographical data, group 2408 may have been perceived as being too far away. However, this group may be close to a regular bus route or subway station and as such travel times are substantially reduced. Thus, group 2408 has been included in the output data set.

The invention claimed is:

1. A method of generating travel time data, comprising the steps of:
   receiving coordinates for a starting location;
   receiving a maximum travel time;
   reading processed graph data comprising nodes representing pre-filtered map features and edges representing travel times between said nodes;
   building a temporary graph of selected nodes that can be reached via selected edges within said maximum travel time;
   receiving candidate destinations; and
   testing the travel time to said candidate destinations with reference to said temporary graph,
   wherein coordinates of each candidate destination are transformed to a modified destination at the location of a node in said processed graph data,
   wherein coordinates of each candidate destination are transformed with reference to a binary space partitioning tree data structure produced by dividing a region of interest repeatedly until each sub-region contains only one of said graph nodes.

2. The method of claim 1, wherein said edges represent variable travel times between adjacent nodes that are dependent upon a temporal component derived from non-exclusively one or more of the following, comprising: time of day, day of the week, time of the year and special activity periods; and
   said temporary graph is built with reference to a time of travel so as to account for said temporal component.

3. The method of claim 1, wherein coordinates of an actual starting location are transformed to a modified origin at the location of a node in said processed graph data.

4. The method of claim 1, wherein each candidate destination is transformed upon arrival, in preference to said building step, thereby reducing the building of said temporary graph to a background process.

5. The method of claim 1, wherein a candidate destination is rejected if it has a location that is displaced from a starting location by a first predetermined distance.

6. The method of claim 1, wherein a candidate destination is rejected if it has a location that is displaced from a nearest node by a second predetermined distance.

7. The method of claim 1, wherein said processed graph data is produced by processing map data to remove features that are not travel related.

8. The method of claim 1, wherein said map data is processed a plurality of times to produce a plurality of processed graph data sets, applicable to respective modes of transport.

9. The method of claim 1, wherein a travel time for each selected node is calculated by subtracting travel times between nodes from said maximum travel time.

10. The method of claim 1, wherein said testing step identifies destinations that can be reached within said maximum travel time and returns data that identifies each candidate with an indication of travel time.

11. The method of claim 10, wherein said identified candidates are ranked in terms of travel time.

* * * * *